US007269907B2

(12) United States Patent
Levine et al.

(10) Patent No.: US 7,269,907 B2
(45) Date of Patent: *Sep. 18, 2007

(54) LASER LINE GENERATING DEVICE WITH SWIVEL BASE

(75) Inventors: Steven R. Levine, Mooresville, NC (US); Jeffrey L. Spanski, Weddington, NC (US); John C. Smith, Denver, NC (US); Derek J. Nash, Huntersville, NC (US); Leslie Daily Gist, Huntersville, NC (US)

(73) Assignee: Irwin Industrial Tool Company, Freeport, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/895,800

(22) Filed: Jul. 21, 2004

(65) Prior Publication Data

US 2005/0155238 A1 Jul. 21, 2005

Related U.S. Application Data

(63) Continuation-in-part of application No. 10/612,035, filed on Jul. 1, 2003.

(51) Int. Cl.
*G01C 15/00* (2006.01)

(52) U.S. Cl. .................. 33/286; 33/DIG. 21; 33/1 N; 248/183.2

(58) Field of Classification Search .................. 33/286, 33/DIG. 21, 285, 227, 228, 1 N, 1 D, 281, 33/282, 283, 354, 347, 376; 248/542, 923, 248/558, 458, 467, 130, 131, 425, 429, 371, 248/349.1, 183.2
See application file for complete search history.

(56) References Cited

U.S. PATENT DOCUMENTS 1,153,760 A    9/1915  Butler (Continued)

FOREIGN PATENT DOCUMENTS

DE          3246359          6/1984

(Continued)

OTHER PUBLICATIONS

International Search Report for International Application No. PCT/US02/14416, dated Aug. 20, 2002.

(Continued)

*Primary Examiner*—G. Bradley Bennett
*Assistant Examiner*—Amy R. Cohen
(74) *Attorney, Agent, or Firm*—Marshall, Gerstein & Borun LLP

(57) ABSTRACT

A laser alignment device includes a laser generating device, an upper attachment portion, and a lower attachment portion. The laser generating device includes a housing and a laser generator. The upper attachment portion is disposed near a bottom of the housing, and the lower attachment portion is pivotally and/or rotationally connected to the upper attachment portion.

28 Claims, 17 Drawing Sheets

U.S. PATENT DOCUMENTS

| | | | |
|---|---|---|---|
| 1,308,809 A | 7/1919 | Reese | |
| 2,431,491 A | 11/1947 | Lee et al. | |
| 2,656,606 A * | 10/1953 | Porter | 33/273 |
| 2,759,696 A | 8/1956 | Nelson | |
| 3,576,409 A | 4/1971 | Fiddler | |
| 3,628,874 A | 12/1971 | Tagnon | |
| 3,635,565 A | 1/1972 | Colson | |
| 3,713,614 A | 1/1973 | Taylor | |
| 3,820,903 A | 6/1974 | Kindl et al. | |
| 3,847,703 A | 11/1974 | Kaiser | |
| 3,897,637 A | 8/1975 | Genho | |
| 3,964,824 A | 6/1976 | Dixon | |
| 4,068,961 A * | 1/1978 | Ebner et al. | 403/55 |
| 4,099,118 A | 7/1978 | Franklin et al. | |
| 4,111,564 A | 9/1978 | Trice | |
| 4,160,285 A * | 7/1979 | Shibla | 362/145 |
| 4,208,801 A * | 6/1980 | Blair | 89/200 |
| 4,221,483 A | 9/1980 | Rando | |
| 4,310,797 A | 1/1982 | Butler | |
| 4,439,927 A | 4/1984 | Elliott | |
| 4,464,622 A | 8/1984 | Franklin | |
| 4,700,489 A | 10/1987 | Vasile | |
| 4,751,782 A | 6/1988 | Ammann | |
| 4,766,673 A | 8/1988 | Bolson | |
| 4,852,265 A | 8/1989 | Rando et al. | |
| 4,853,617 A | 8/1989 | Douglas et al. | |
| 4,854,704 A | 8/1989 | Funazaki et al. | |
| 4,859,931 A | 8/1989 | Yamashita et al. | |
| 4,912,851 A | 4/1990 | Rando et al. | |
| 4,988,192 A | 1/1991 | Knittel | |
| 4,992,741 A | 2/1991 | Douglas et al. | |
| 4,993,161 A | 2/1991 | Borkovitz | |
| 5,033,848 A | 7/1991 | Hart et al. | |
| 5,063,679 A * | 11/1991 | Schwandt | 33/347 |
| 5,075,977 A | 12/1991 | Rando | |
| 5,108,177 A | 4/1992 | Middleton | |
| 5,144,487 A | 9/1992 | Hersey | |
| 5,148,108 A | 9/1992 | Dufour | |
| 5,182,863 A | 2/1993 | Rando | |
| 5,208,438 A | 5/1993 | Underberg | |
| D339,074 S | 9/1993 | Dufour | |
| 5,243,398 A | 9/1993 | Nielsen | |
| 5,264,670 A | 11/1993 | Leonard | |
| 5,287,365 A | 2/1994 | Nielsen et al. | |
| 5,287,627 A | 2/1994 | Rando | |
| 5,317,253 A | 5/1994 | Kronberg | |
| 5,367,779 A | 11/1994 | Lee | |
| 5,394,616 A | 3/1995 | Claxton | |
| 5,400,514 A | 3/1995 | Imbrie et al. | |
| 5,457,394 A | 10/1995 | McEwan | |
| 5,459,932 A | 10/1995 | Rando et al. | |
| 5,481,809 A | 1/1996 | Rooney | |
| 5,485,266 A | 1/1996 | Hirano et al. | |
| 5,516,581 A * | 5/1996 | Kreckel et al. | 428/317.3 |
| 5,524,352 A | 6/1996 | Rando et al. | |
| 5,531,031 A | 7/1996 | Green | |
| 5,533,268 A | 7/1996 | Keightley | |
| 5,539,990 A | 7/1996 | Le | |
| 5,541,727 A | 7/1996 | Rando et al. | |
| 5,552,886 A | 9/1996 | Kitajima et al. | |
| 5,572,796 A | 11/1996 | Breda | |
| 5,584,458 A | 12/1996 | Rando | |
| 5,594,993 A | 1/1997 | Tager et al. | |
| 5,604,987 A | 2/1997 | Cupp | |
| 5,606,802 A | 3/1997 | Ogawa | |
| 5,610,711 A | 3/1997 | Rando | |
| 5,617,202 A | 4/1997 | Rando | |
| 5,619,802 A | 4/1997 | Rando et al. | |
| 5,621,975 A | 4/1997 | Rando | |
| D382,255 S | 8/1997 | Moffatt | |
| 5,655,307 A | 8/1997 | Ogawa et al. | |
| 5,666,736 A * | 9/1997 | Wen | 33/291 |
| 5,680,208 A | 10/1997 | Butler et al. | |
| 5,689,330 A | 11/1997 | Gerard et al. | |
| 5,742,387 A | 4/1998 | Ammann | |
| 5,754,287 A | 5/1998 | Clarke | |
| 5,754,582 A | 5/1998 | Dong | |
| 5,777,899 A | 7/1998 | Kumagai | |
| 5,782,003 A | 7/1998 | Bozzo | |
| 5,790,248 A | 8/1998 | Ammann | |
| 5,819,424 A | 10/1998 | Ohtomo et al. | |
| 5,836,081 A | 11/1998 | Orosz | |
| 5,839,199 A | 11/1998 | Ogawa | |
| 5,852,493 A | 12/1998 | Monnin | |
| 5,864,956 A | 2/1999 | Dong | |
| 5,872,657 A | 2/1999 | Rando | |
| 5,900,931 A | 5/1999 | Rando | |
| 5,903,345 A | 5/1999 | Butler et al. | |
| 5,907,907 A | 6/1999 | Ohtomo et al. | |
| 5,917,587 A | 6/1999 | Rando | |
| D412,674 S | 8/1999 | Kaiser | |
| 5,946,087 A | 8/1999 | Kasori et al. | |
| 5,967,645 A | 10/1999 | Anderson | |
| 5,983,510 A | 11/1999 | Wu et al. | |
| 5,992,029 A | 11/1999 | Dong | |
| 5,994,688 A | 11/1999 | Jackson et al. | |
| 6,000,813 A | 12/1999 | Krietzman | |
| 6,005,716 A | 12/1999 | Ligtenberg et al. | |
| 6,005,719 A | 12/1999 | Rando | |
| D419,545 S | 1/2000 | Krantz et al. | |
| D419,546 S | 1/2000 | Krantz et al. | |
| 6,009,630 A | 1/2000 | Rando | |
| 6,012,229 A | 1/2000 | Shiao | |
| 6,014,211 A | 1/2000 | Middleton et al. | |
| 6,028,665 A | 2/2000 | McQueen | |
| 6,035,540 A | 3/2000 | Wu et al. | |
| 6,037,874 A | 3/2000 | Heironimus | |
| 6,043,879 A | 3/2000 | Dong | |
| 6,065,217 A | 5/2000 | Dong | |
| 6,067,152 A | 5/2000 | Rando | |
| D427,166 S | 6/2000 | Krantz | |
| 6,073,353 A | 6/2000 | Ghtomo et al. | |
| 6,073,354 A | 6/2000 | Rando | |
| 6,082,013 A | 7/2000 | Peterhans | |
| 6,082,875 A | 7/2000 | Kousek | |
| 6,101,728 A | 8/2000 | Keng | |
| 6,104,479 A | 8/2000 | Ohtomo et al. | |
| 6,163,969 A | 12/2000 | Jan et al. | |
| 6,178,649 B1 | 1/2001 | Wu | |
| 6,195,902 B1 * | 3/2001 | Jan et al. | 33/286 |
| 6,202,312 B1 | 3/2001 | Rando | |
| 6,209,219 B1 | 4/2001 | Wakefield et al. | |
| 6,211,662 B1 | 4/2001 | Bijawat et al. | |
| 6,215,293 B1 | 4/2001 | Yim | |
| 6,249,113 B1 | 6/2001 | Krantz et al. | |
| 6,249,983 B1 * | 6/2001 | Wright et al. | 33/286 |
| 6,259,241 B1 | 7/2001 | Krantz | |
| 6,301,997 B1 | 10/2001 | Welte | |
| 6,313,912 B1 | 11/2001 | Piske et al. | |
| 6,351,890 B1 | 3/2002 | Williams | |
| 6,360,446 B1 | 3/2002 | Bijawat et al. | |
| D455,430 S | 4/2002 | Krantz | |
| D455,750 S | 4/2002 | Krantz | |
| 6,363,622 B1 | 4/2002 | Stratton | |
| 6,384,420 B1 | 5/2002 | Bozzo | |
| 6,384,913 B1 | 5/2002 | Douglas et al. | |
| 6,427,347 B1 | 8/2002 | Butler | |
| 6,449,856 B1 | 9/2002 | Matsumoto et al. | |
| 6,452,097 B1 | 9/2002 | DeWall | |
| 6,481,686 B1 * | 11/2002 | Jan | 248/349.1 |
| 6,493,952 B1 | 12/2002 | Kousek et al. | |
| 6,493,955 B1 | 12/2002 | Moretti | |
| D469,556 S | 1/2003 | Malard et al. | |
| 6,502,319 B1 | 1/2003 | Goodrich et al. | |

| | | |
|---|---|---|
| D470,423 S | 2/2003 | Loudenslager et al. |
| 6,513,954 B2 | 2/2003 | Ebersole |
| 6,532,676 B2 | 3/2003 | Cunningham |
| 6,536,122 B2 | 3/2003 | Tamamura |
| 6,542,304 B2 | 4/2003 | Tacklind et al. |
| 6,546,636 B2 | 4/2003 | Tamamura |
| 6,568,094 B2 | 5/2003 | Wu |
| 6,569,521 B1 * | 5/2003 | Sheridan et al. ............ 428/343 |
| 6,604,291 B2 | 8/2003 | Waibel et al. |
| 6,606,798 B2 | 8/2003 | El-Katcha et al. |
| 6,625,895 B2 | 9/2003 | Tacklind et al. |
| 6,688,011 B2 | 2/2004 | Gamal et al. |
| 6,782,034 B2 * | 8/2004 | Li .............................. 372/109 |
| 7,055,252 B2 * | 6/2006 | Wu ............................. 33/286 |
| 2001/0007420 A1 | 7/2001 | Bijawat et al. |
| 2001/0029675 A1 | 10/2001 | Webb |
| 2001/0034944 A1 | 11/2001 | Cunningham |
| 2002/0083603 A1 * | 7/2002 | Jang ............................ 33/281 |
| 2002/0162233 A1 | 11/2002 | El-Katcha et al. |
| 2002/0178596 A1 | 12/2002 | Malard et al. |
| 2003/0061720 A1 | 4/2003 | Waibel |
| 2003/0101605 A1 | 6/2003 | Tacklind et al. |
| 2003/0101606 A1 | 6/2003 | Li |
| 2003/0106226 A1 | 6/2003 | Tacklind et al. |
| 2003/0145474 A1 | 8/2003 | Tacklind et al. |
| 2003/0177652 A1 | 9/2003 | Sawaguchi |
| 2003/0229997 A1 | 12/2003 | Gamal et al. |
| 2003/0231303 A1 | 12/2003 | Raskin et al. |
| 2004/0031163 A1 | 2/2004 | El-Katcha et al. |

FOREIGN PATENT DOCUMENTS

| | | |
|---|---|---|
| GB | 2131908 | 6/1984 |
| GB | 2345541 | 7/2000 |
| WO | WO98/51994 | 11/1998 |
| WO | WO-98/58232 | 12/1998 |
| WO | WO-2004/113985 | 12/2004 |

OTHER PUBLICATIONS

International Search Report for International Application PCT/US03/06269, dated Sep. 3, 2003.

Written Opinion for International Application No. PCT/US02/14416, dated May 27, 2003.

United Kingdom Search Report for United Kingdom Patent Application No. 0514904.2., dated Nov. 9, 2005.

International Search Report in Application No. PCT/US2004/018724, dated May 9, 2005.

Written Opinion of the International Searching Authority in Application No. PCT/US2004/018724, dated May 9, 2005.

* cited by examiner

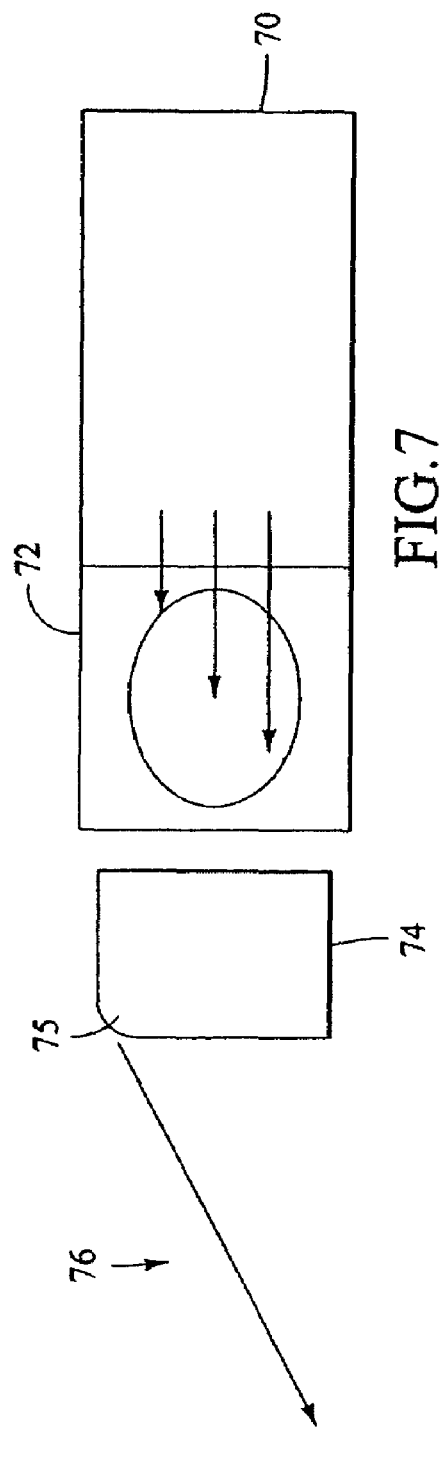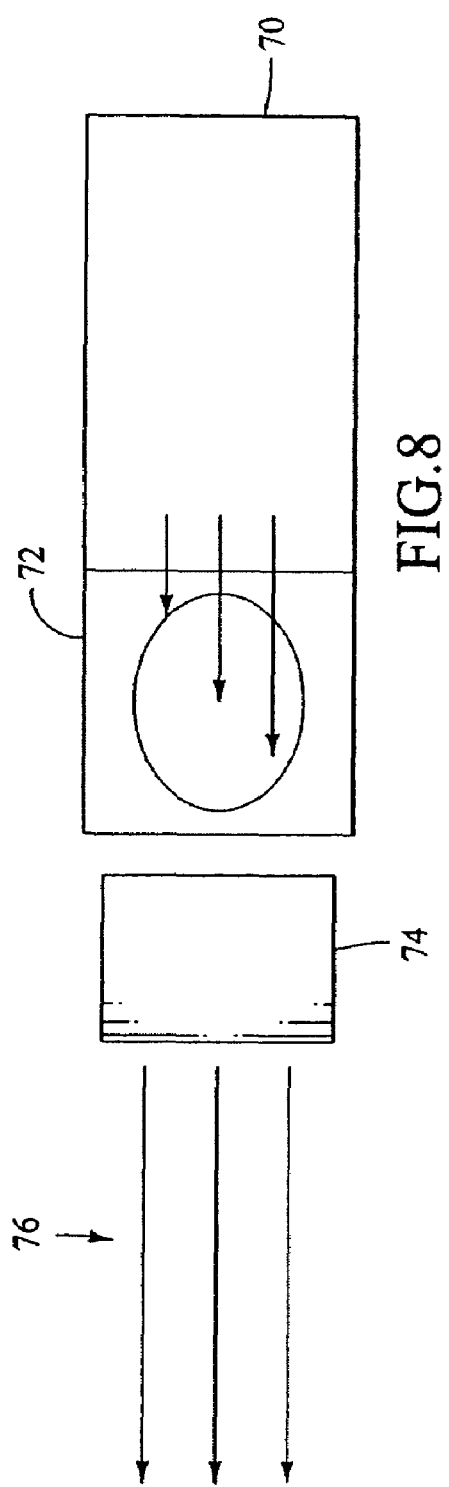

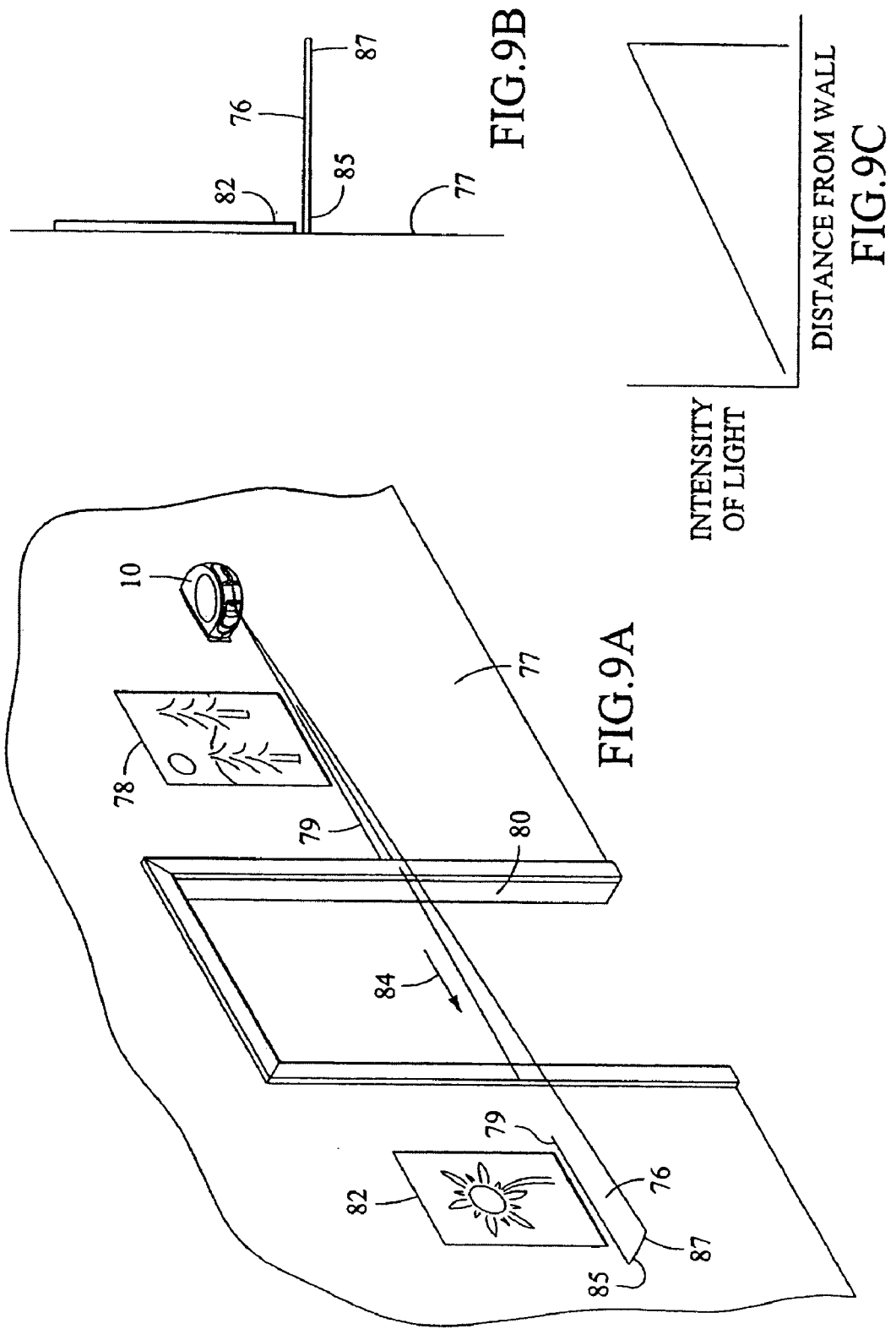

LASER LINE GENERATING DEVICE WITH SWIVEL BASE

RELATED APPLICATION DATA

The present application is a continuation-in-part application based on, and claiming the priority benefit of, co-pending U.S. application Ser. No. 10/612,035, which was filed on Jul. 1, 2003, and which is expressly incorporated by reference herein.

FIELD OF THE INVENTION

The technical field of the disclosure is that of alignment devices and, in particular, an alignment device and an attachment that allows the alignment device to be releasably attached to a surface on which alignment is desired and that is able to rotate and pivot relative to that surface.

BACKGROUND

Alignment of surfaces is a perennial problem in a variety of fields, ranging from construction to interior decorating. Alignment is necessary for walls that should be perpendicular to a floor, or otherwise plumb. Masonry and brick-laying practitioners are well aware of the importance of plumbed and aligned surfaces and chalk lines. A home interior decorated with pictures and other wall ornamentation makes a much better appearance when the ornamentation is aligned, especially with respect to vertical or horizontal alignment. Many mechanical and electrical alignment devices are available, and some laser devices are available. However, some of these products are cumbersome, and others are not suitable for certain uses. Chalk lines, for instance, are sometimes undesirable for use in finished, interior areas.

One aspect of alignment-product performance, and in particular of laser-alignment products, that could be improved is the width, brightness and straightness of the laser light. A visible, straight laser line is acceptable, but may be limited in its brightness over a distance, and may also tend to defocus and become dimmer as a user works further away from the source of the laser. Rotating lasers are used to project lines on walls perpendicular to the direction of propagation of the laser. As a result, such devices may have limited utility or may not work in confined spaces requiring a longer alignment tool.

Moreover, a conventional laser is not well-equipped for projecting a flat or planar beam of light. The essence of laser light is that it is coherent or substantially monochromatic, that is, of a single wavelength or of a narrow band of wavelengths. Thus, when a beam of laser light is refracted through a prism, the prism output does not result in a spreading of the beam as with ordinary "white" light, but rather results in a coherent, focused beam, very similar to the input. The laser beam is thin and is visible in a useful manner only when projected onto a surface.

Another aspect of laser alignment products that could be improved is the inability of laser devices to work around obstructions. That is, if a wall-hanging, such as a picture frame, interrupts the laser beam, it may be blocked from further projection. In this case, it is necessary to mark locations or heights, one by one, rather than working with the actual objects, in order to align them. Obstructions may include moldings placed in a doorway, picture frames in the way of those being aligned on one horizontal line, the operator of the device, other obstacles, or even textured or stuccoed surfaces on interior walls.

While there are devices that direct a laser beam parallel to but away from a surface requiring alignment, these devices require the use of a marker device or detector component to sight the beam and mark corresponding locations on the wall adjacent the beam. Use of such a device requires multiple components and at least two people, one to align the laser and another to mark the wall. Moreover, the wall itself requires marking with this method.

Another aspect of laser alignment products that could be improved is the inability of laser alignment devices to rotate or pivot relative the wall or object on which the laser light is intended to operate. With such limitations, a user must mark a first laser line, move the laser alignment devices angularly relative to the first mark, and then project and mark a second laser line. As a result of having to move laser alignment device and mark the laser line several times, inaccuracies in the measurements may occur, the wall may more easily become damaged, and unnecessary time is wasted.

A conventional laser beam projector is thus not able to project a laser line on the wall on which it is mounted, nor can it go around obstructions. A laser alignment beam mounted on the wall where alignment is needed would allow a person seeking alignment, whether a carpenter, a painter, or an interior decorator, to accomplish his or her task in a quicker and easier fashion. The ability to work around obstacles would save much time and effort. Such laser alignment devices must be aligned themselves, and are typically equipped with a tripod and a sophisticated leveling device so that they read true for horizontal and vertical plumbs. While leveling is necessary, such sophistication as a tripod adds to the expense and bulkiness of the leveling device. What is desired is a convenient, easy-to-level laser device useful for aligning objects. It would be even more desirable if the alignment device could be easily mounted on a vertical or horizontal surface, and oriented in the desired direction. Better alignment devices are thus required to overcome these deficiencies in the prior art.

SUMMARY OF THE DISCLOSURE

A laser alignment device includes a laser generating device, an upper attachment portion, and a lower attachment portion. The laser generating device includes a housing and a laser generator, while the upper attachment portion is disposed near a bottom of the housing, and the lower attachment portion is pivotally connected to the upper attachment portion, to allow the laser generating device to pivot with respect to surfaces on which the laser generating device is mounted.

If desired, the lower attachment portion may also or instead be rotatably connected to the upper attachment portion to allow the laser generating devices to rotate about an axis. Still further, the lower attachment portion may include a plurality of index markings around a periphery of the lower attachment portion to enable a user to move a laser light to a particular rotational position or angle with respect to an initial position.

BRIEF DESCRIPTION OF THE DRAWINGS

FIG. 7 depicts a side view of the workings of a second embodiment of laser light generator optics to be used with the laser line generator of FIG. 1;

FIG. 8 depicts a top view of the workings of the laser light generator optics of FIG. 7;

FIGS. 9A, 9B, and 9C depict a laser line generating device projecting the laser light in a narrow beam or a fan beam and aligning objects on a wall;

DETAILED DESCRIPTION

Figure 1:
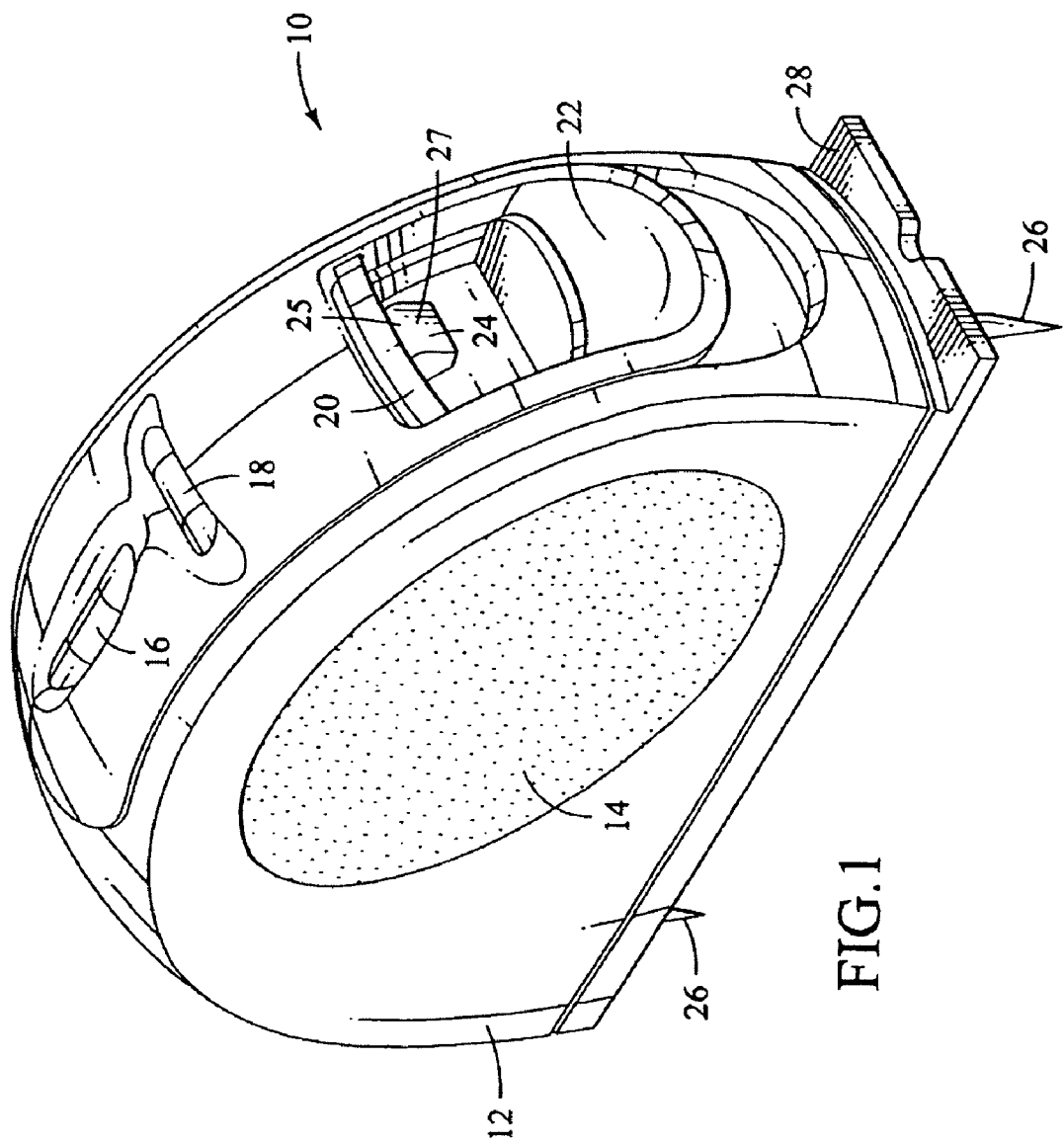
FIG. 1 is an isometric view of an outside of an embodiment of a laser line generator.

The present invention is better understood by reference to the figures and description below. FIG. 1 presents a view of a leveling device, such as laser alignment device and generator 10. The generator 10 comes in a housing 12, which may be made of plastic or other suitable material such as metal, and it possesses a handgrip area 14 for handling, the area 14 preferably made of an elastomeric substance for easier gripping. The generator 10 may have a first leveling indicator 16 such as a spirit level or "bubble" level for orientating or leveling the generator 10 in a first plane. If desired, the level indicator may be selected from the group consisting of a pendulum, a cantilevered tilt mechanism, an electronic leveler, and a shaft held between journals or leveling in one plane, such as horizontal or vertical. The generator 10 may also have a second leveling indicator 18, for orientation or leveling in a second plane perpendicular to the first plane. The housing 12 may also contain a protective door 20 with a linked switch for turning on the laser light source when opening the door for access to the laser beam. The generator also may have one or more sliding pin actuators 22 suitable for use by a finger or a thumb and mechanically connected for extending or retracting one or more pins 26 from the generator bottom 28. Without a swivel base attached to the bottom 28, each pin 26 desirably penetrates into a surface, such as a drywall or lumber surface, to suspend and hold the laser generator 10 on the surface while it is in use. FIG. 1 depicts the door or aperture 20 in an open position and a projection lens 24. The door 20 provides an exit for the light generated within the housing, and in the open position, does not substantially block the exit of light from the housing 12.

As shown in FIG. 1, a preferred projection lens 24 includes a rounded corner 25 on its front face 27. The effect of the lens is to shape the laser light passing through it into a planar, fan-shaped "comet beam" or fan shape. The intensity of the light and the shape of the beam may be asymmetric, in which one side of the "comet" may be larger and brighter than the other side. The fan shaped beam is then routed so that the less bright side of the fan-shaped beam is nearest the wall of interest, and the brighter side is away from the wall. In this orientation, the fan-shaped beam of light will propagate a long distance from its origin, and the laser light will be usable a long distance away from the laser line generating device.

The laser light generated by the laser line generator preferably exits from the top, curved corner of the lens. The radius of the corner is desirably from about 0.030 inches (0.75 mm) to about 0.060 (1.50 mm) inches, and preferably about 0.047 inches (1.2 mm). The height of the rounded corner of the lens is desirably one or two inches above the bottom surface of the laser line generating device. When the beam or fan of light exits the lens, it forms a thin plane in the length-wise direction of the device, and the beam forms a plane from the top, curved corner of the lens downward, to the wall or other surface on which alignment is sought. Because the light is now a plane, rather than a pinpoint, it is able to project over and beyond obstacles, allowing a user to align several objects without having to move them.

In the embodiments shown, the laser light is projected along an alignment surface or working surface, which may be a generally flat, planar support surface. The direction of propagation, which is the direction the light travels, is generally parallel to the wall or surface on which the laser line generating device is mounted. The fan-shaped aspect of the beam is perpendicular to the wall, and is preferably no higher than the height of the lens 24 above the wall. The laser light generating device and its lens may be mounted on the wall via pins 26, the swivel base, adhesive, or the like, which is discussed below. The fanshape of the beam may extend from a height of the lens above the wall to the wall surface itself, in a very thin plane, about ⅟32 of an inch thick. The plane of the fan-shaped beam is also perpendicular to the flat bottom surface of the laser line generating device.

Figure 2:
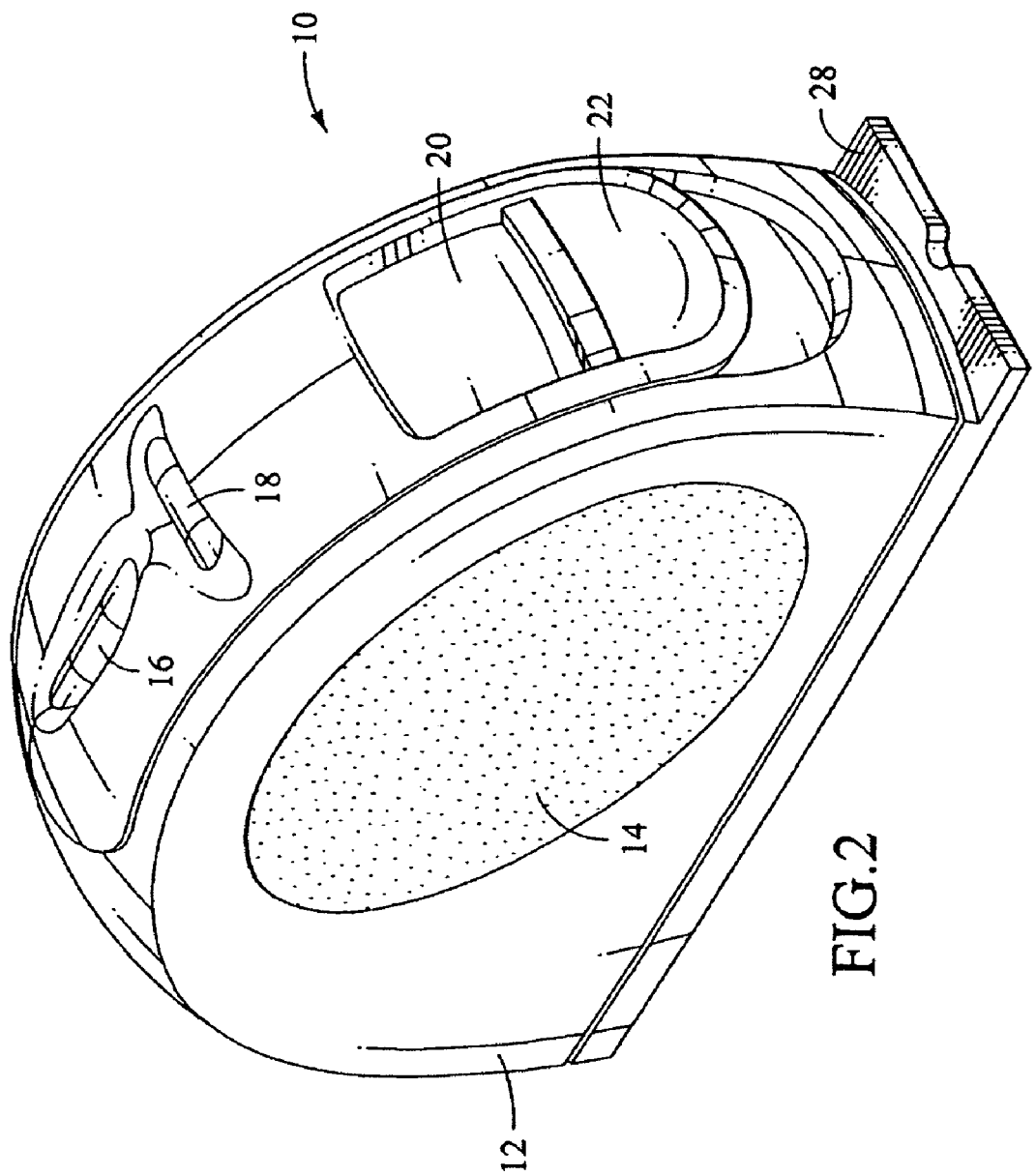
FIG. 2 is an alternate view of the generator of FIG. 1.

FIG. 2 depicts the same device with the door 20 closed, and with a linked internal switch (not shown) open, and the laser thus off. The figure depicts the generator 10, housing 12, gripping surface 14, and levels 16, 18 with pin actuator 22 raised so that the pin 26 remains inside the housing 12 and the laser generator 10 is not suspended on a wall or other surface. The door or aperture 20 may also be a switch for the power supply of the laser line generating device. In the position shown in FIG. 2, with the door closed, the switch is preferably in an open position and there is no power supplied from the power supply to the light source. In this position, the door acts as a lens cover that may protect the lens from particulates, such as water, dust, debris, and the like.

Figure 3:
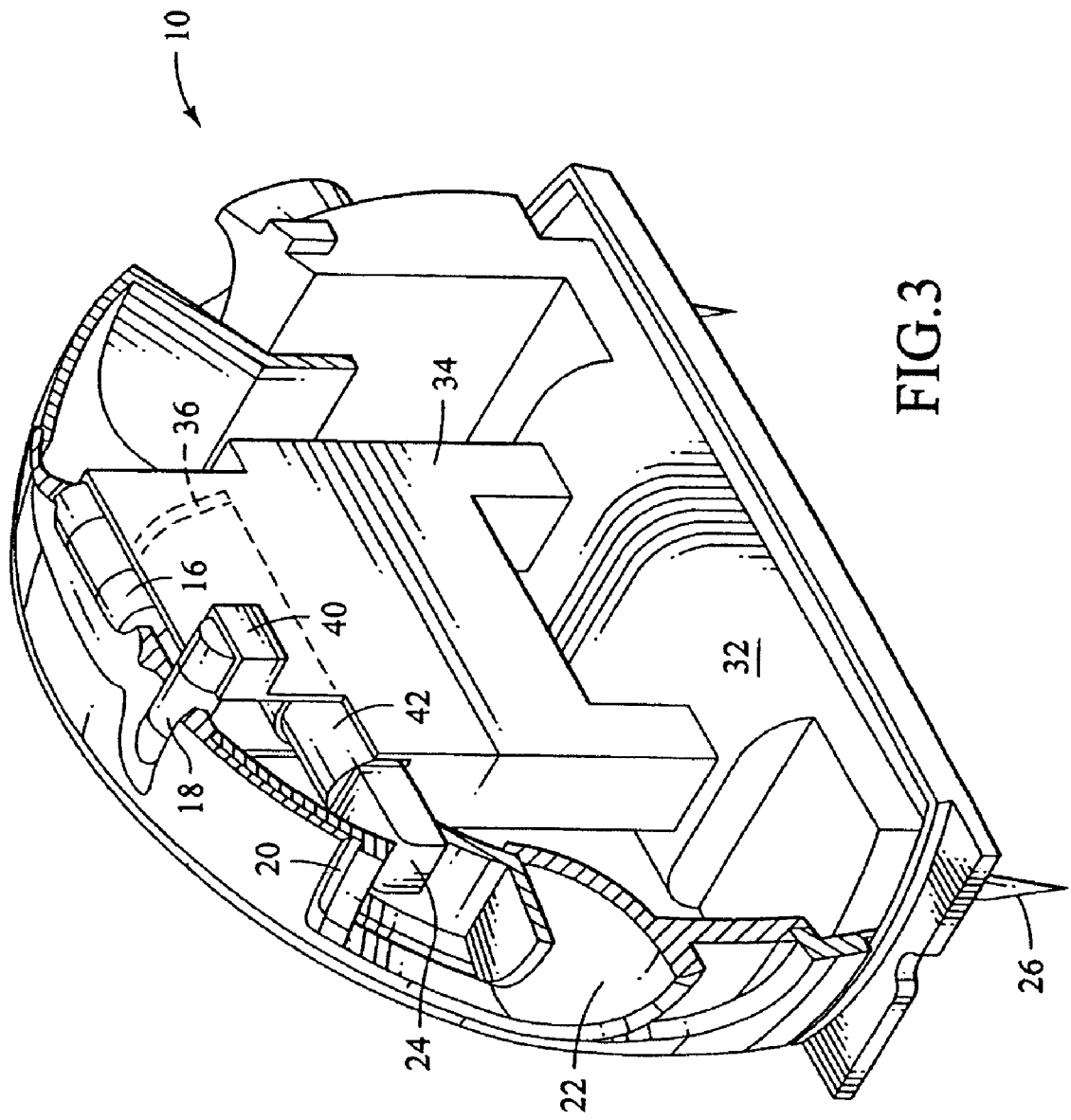
FIG. 3 is a cutaway isometric view showing the inside of the generator of FIG. 1.
Figure 4:
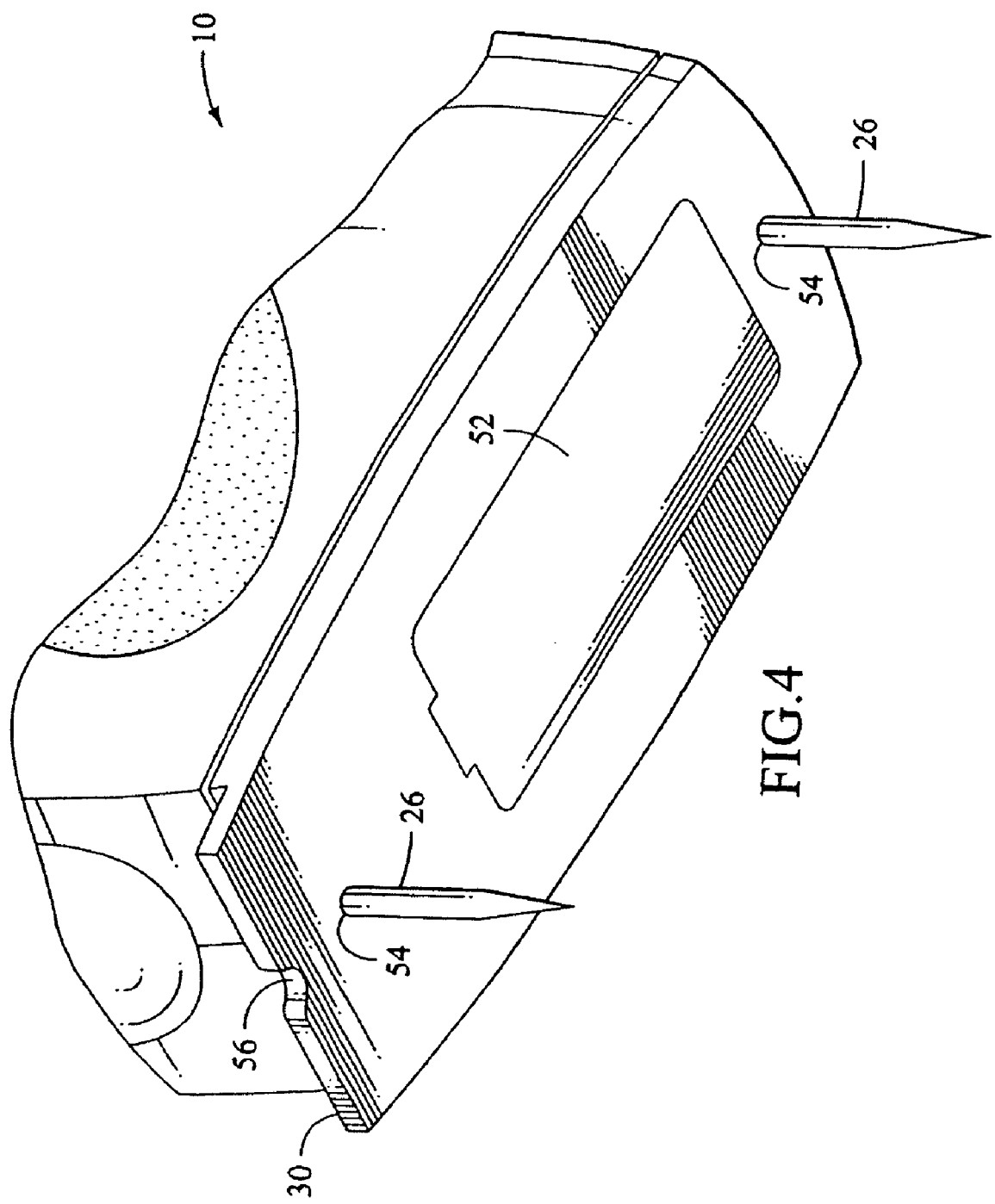
FIG. 4 is a view depicting the bottom of the generator of FIG. 1.
Figure 5:
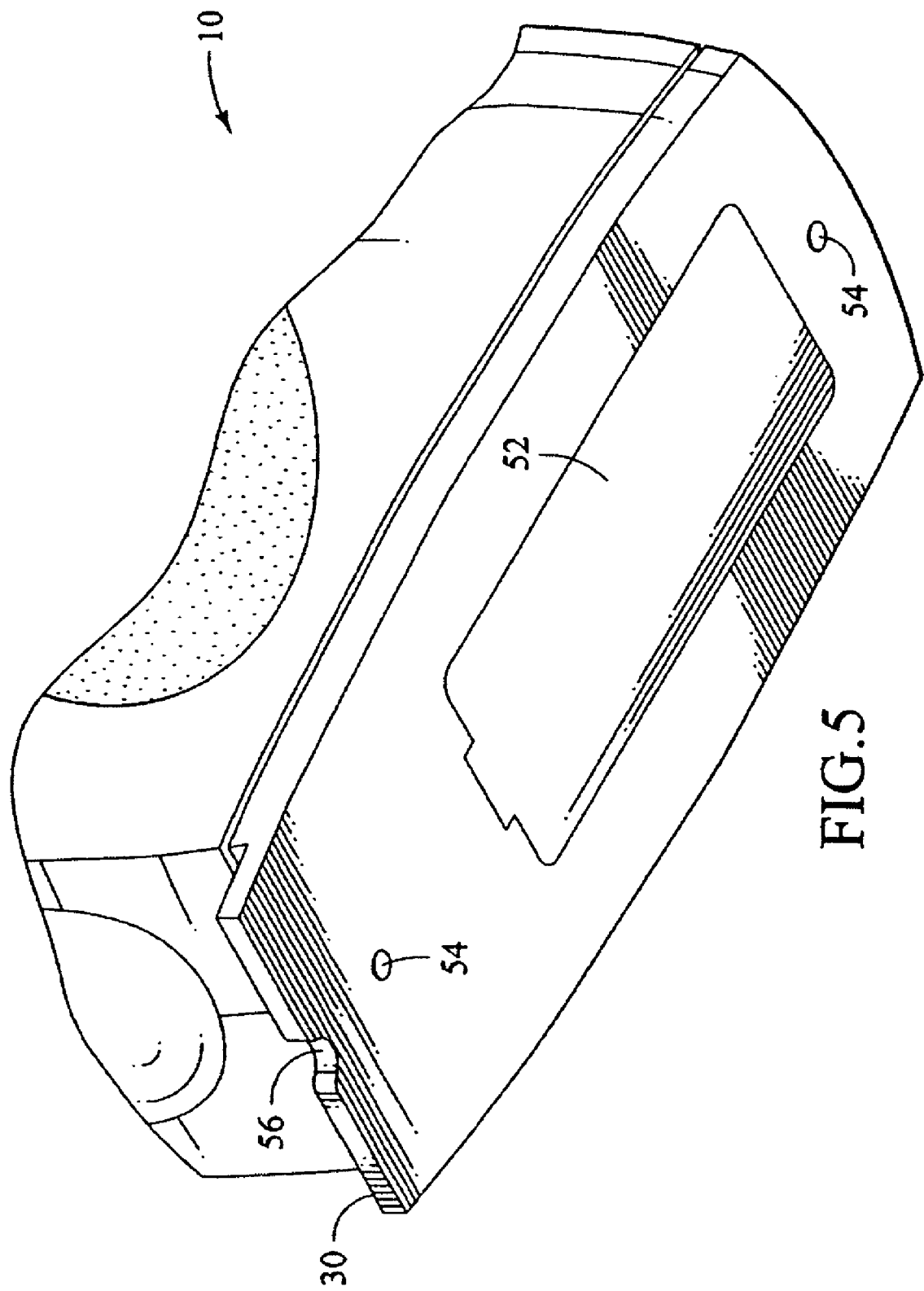
FIG. 5 is another view depicting the bottom of the generator of FIG. 1.

FIG. 3 depicts a cutaway view of the interior of the laser generator, showing a supporting structure 34, 40, for levels 16, 18, and also showing an area for a power source or battery 32, a laser diode 42, a lens 24, and a circuit board 36. FIG. 4 more clearly depicts a view from the bottom or flat face 30 of the generator 10. The bottom surface desirably has a door 52 for access to a battery or power source for the generator 10. Alternatively, the door 52 may be disposed elsewhere on the generator 10 such as, for example, near a rear of the housing 12. Also shown are holes 54 for the retractable pins 26 used to secure the generator 10 to a wall or a surface. A notch 56 may also be useful for aligning or orienting the generator on a surface. FIG. 5 depicts the bottom of the laser generator 10 with the pins 26 retracted, with a better view of holes 54.

A method of practicing the invention includes providing a working surface, such as a wall wherein orientation with a line is desired, and also providing the laser generator 10. In the case where pins 26 are not used, a user may mount the laser generator 10 via its flat surface, a swivel base, or other attachment (see FIGS. 5A, 5B, and 10-12D) onto the wall and may orient the laser generator 10 in one or more planes. A reference level, such as the bubble level 18, may then be used to orient and true the laser generator 10 in one plane, for instance, the vertical plane, using the swiveling base described below. The second bubble level 16 may be used if the user wishes to orient the laser generator 10 in a horizontal plane. When the user is satisfied with the orientation, the user may turn on the generator 10, projecting a laser beam from the vertical or horizontal plane of the device. In one embodiment, the generator 10 is turned on by opening the lens door 20. The swivel base, as used herein, may refer to a base or attachment of or to the generator 10, that may include or enable one or more types of movement. For example, as will be described in more detail below, the generator 10 may rotate and/or pivot relative to a working surface and/or attachment.

Figure 5A:
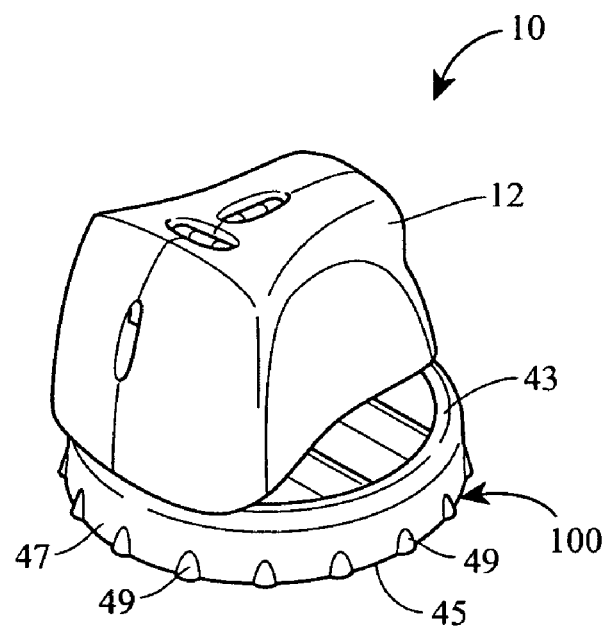
FIG. 5A is an isometric view of an alternate embodiment of a laser line generator having a rotational capability.

The laser generator 10 may also include variations and/or additions. For example, the laser generator 10 need not include a bottom 28, but may be attached, rotateably, fixedly, or otherwise to an attachment 100 via the housing 12. More specifically, as seen in FIG. 5A, the housing 12 of the laser generator 10 may be rotatably attached to an attachment 100 that, in this exemplary embodiment, may be a generally oval or circular structure having a top surface 43 and a bottom surface 45. The attachment 100 may further include an outer wall 47 disposed between the top and bottom surfaces 43, 45 that may define an outer periphery of the attachment 100. The attachment 100 and, more specifically, the outer wall 47 may include a plurality of equally spaced markers or indicators 49 disposed radially around the laser generator 10 and along the outer wall 47 of the attachment 100. The attachment 100 may be attached to the housing 12 and/or the bottom 28 of the laser generator 10 by a screw or bolt (not shown), but may be attached in other manners including, but not limited to, a snap mechanism, and the like. In this case, the generator 10 may rotate relative to the attachment 100 and/or the working surface or wall. For example, a user may place the generator 10 on the working surface such that the bottom surface 45 of the generator 10 is operatively attached parallel to the working surface. The user, with the generator 10 as such, may indicate a first laser light line and then rotate the generator 10, with the bottom surface 45 of the generator 10 remaining in position, and then indicate a second laser light line. As a result, the user may align or indicate two planes or axis along a shared pivot point.

Figure 5B:
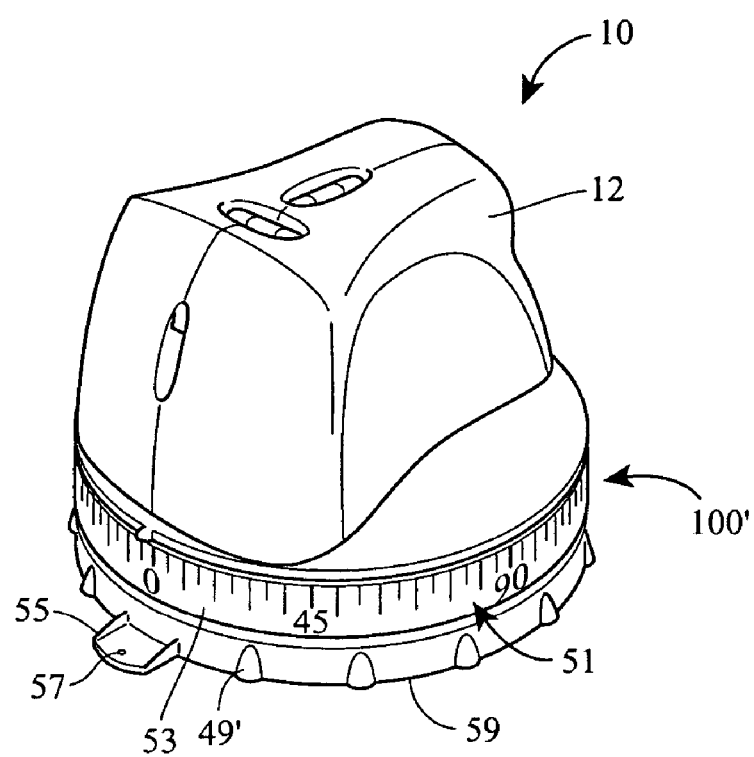
FIG. 5B is an isometric view of an alternate embodiment of a laser line generator with a rotational indexing system.

In another exemplary embodiment, as seen in FIG. 5B, the housing 12 of the laser generator 10 may be rotatably attached to an attachment 100' having a plurality of equally spaced markers 49' and an indexing system 51. The indexing system 51 like the markers 49' may be disposed radially around the laser generator 10 and, more specifically, may be disposed along an outer wall 47' of the attachment 100'. The indexing system 49', as in this example, may represent the degrees of rotation about the laser generator 10, such that a user can determine the number of degrees present between a first position and a second position of the laser light and/or rotate the laser light at predetermined angles, such as forty-five degrees or ninety degrees. More specifically as seen in FIG. 5B, the indexing system 51 may include a numerical forty-five degree and ninety degree marker every ninety degrees around the outer periphery of the attachment 100' and, may include a tick marker every five degrees therebetween. Alternatively or in addition, the indexing system 51 may include a separate indexing ring 53 that is rotatable relative to the attachment 100'. Additionally, the attachment 100' may include one or more tabs 55 having an aperture 57 disposed near a bottom surface 59 of the attachment 100' such that a pin or the like may be placed therein or there through.

In operation, a user may rotate the generator 10, as shown on FIG. 5A, and as described above. A user may similarly rotate the generator 10, as shown on FIG. 5B, with the additional features of indexing one or more of the laser light lines, and pivoting the generator 10 relative to a working surface, which will be described in more detail hereafter. With the indexing system 51, however, a user may orient a plurality of the laser light lines angularly relative to each other. For example, the user may place the generator 10 on a working surface and indicate a first laser light line. In this orientation, the user may rotate the indexing ring 53 or may rotate the entire attachment 100', such that the first laser line corresponds, or is in-line with one of the index markings which, in this example, is a zero degree mark. The user may then rotate the generator 10 and align or orient a second laser line with a second marking such as, for example, a ninety degree mark. As a result, the user has aligned or oriented the first and the second laser lines at a ninety degree angle relative to each other.

A desirable feature of the invention is that the output of the generator 10 is not merely a linear beam of light, but rather a fan-shaped beam. The fan-shaped beam propagates along the surface of the wall in the direction of propagation. Because the plane of the beam runs perpendicular to the wall along the length of the beam, the line of intersection between the beam and the wall forms a visible line of alignment. With a fan-shaped beam, the laser light is able to project over and beyond obstacles, such as moldings placed in a doorway, picture frames in the way of those being aligned on one horizontal line, or other obstacles, such as a wavy or stuccoed surface on an interior wall. With a conventional laser generator, these obstacles must be removed or the laser itself must be repositioned to avoid each obstacle. Of course, moving and relocating the laser alignment tool destroys the continuity of the line of alignment. Moreover, a conventional laser is not well-equipped for shaping the laser beam into a fan. The essence of laser light is that it is coherent, that is, of a single wavelength or a narrow wavelength band. Thus, when laser light is refracted through a prism, the prism output is not a spreading of the beam as with ordinary "white" light, but rather is a coherent, focused beam, very similar to the input. The present invention overcomes this obstacle by sending a sharp, focused pinpoint of light through a specifically constructed lens to create a flat planar, fan-shaped beam of light.

It is also noteworthy that the axis of alignment, such as the alignment of pictures on a wall, is substantially parallel to the direction of propagation of the laser light. By contrast, a conventional and less useful method is to project a laser light perpendicular to a wall or other surface in which alignment is desired, and perpendicular to the direction of propagation. With the instant laser line marking device, a user projects a fan-shaped beam in a propagation direction that is substantially parallel, rather than perpendicular, to the surface on which alignment is desired, the fan-shaped dimension of the beam being perpendicular to the wall.

As seen in FIG. 9A, the laser line generating device 10 propagates light in the length-wise direction of the laser line generating device 10. The direction of propagation, shown by arrow 84, is substantially parallel to the wall, with the fan-shaped aspect of the beam being perpendicular to the wall. In one example, if a narrow fan projects from a line marking device according to the present invention, the beam is "substantially parallel" if it is substantially parallel for at least several lengths of the line marking device in the direction of propagation of the laser. It is substantially parallel because even a "narrow" fan spreads rapidly and the beam is no longer strictly parallel. The device and the beam are easily distinguished, however, from a beam that has a direction of propagation perpendicular to the wall, such as shown in U.S. Pat. No. 5,208,438.

The laser light exits the lens or prism in an elongated fan in a direction of propagation. The direction of propagation, as discussed above, is substantially parallel to the surface on which alignment is desired. The width of the fan, however, is perpendicular to the surface, and the intersection of the beam with the surface generates the visible line of alignment that the user seeks. It is this width that allows the fan to project over and beyond obstacles. That is, even though an obstacle may partially obscure the fan-shaped beam of light, at least part of the fan-shaped beam extends above and beyond the obstacle, and a user may continue to align objects on which alignment is desired.

Figure 6:
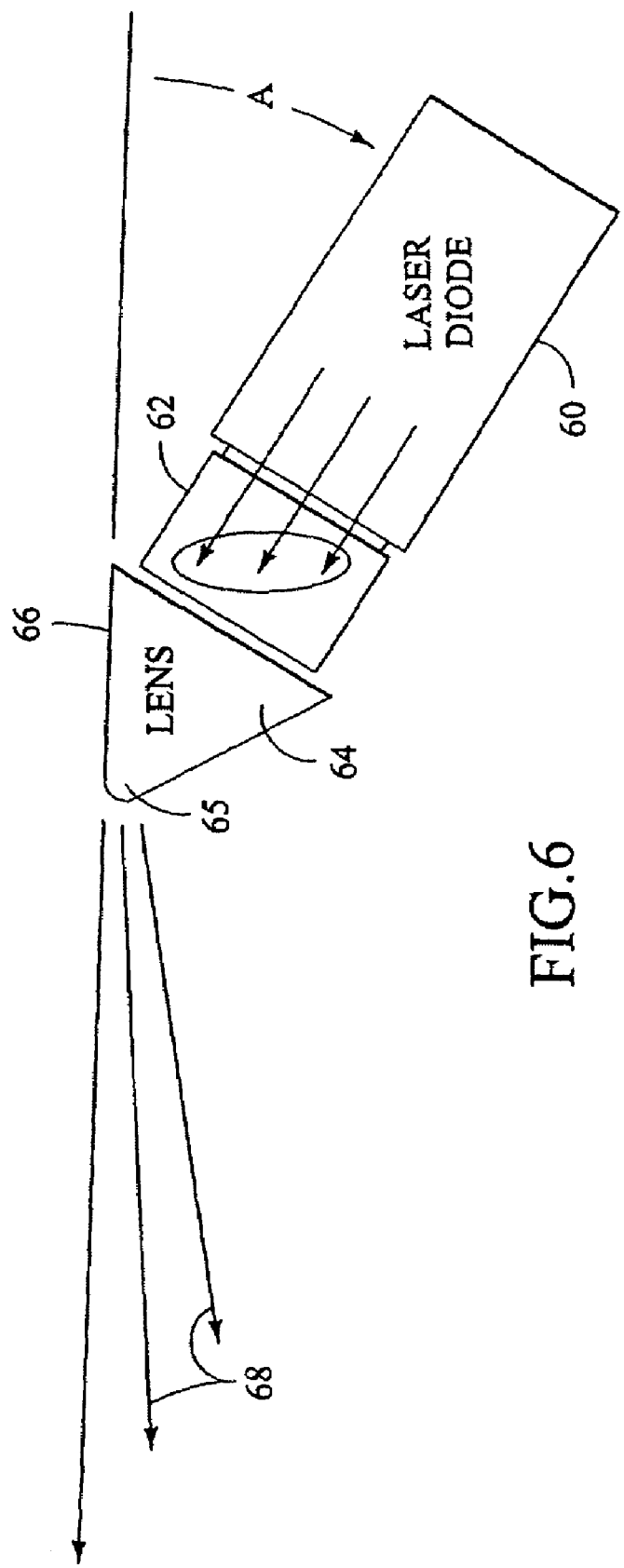
FIG. 6 depicts an embodiment of optics to be used with the laser light generator of FIG. 1.

FIG. 6 depicts an embodiment of the invention in which a laser diode 60 emits coherent laser light, such as, coherent laser light at 635 nm wavelength. The light is collimated into an ovate shape by collimation optics 62, for instance at least one collimating lens, by techniques well known to those skilled in optic arts. The ovate beam then enters a projection lens 64 from the right side in FIG. 6, desirably at an angle in which total internal reflection will occur, that is, all the incident light will be reflected rather than refracted from the back face of the lens. It has been found that this phenomenon is reinforced further if the back surface 66 of the lens is mirrored. The phenomenon is also reinforced if a corner of the lens or prism is radiused as mentioned above. When the light emerges from the radiused corner 65 of the projection lens 64 in FIG. 6, it is in the shape of a narrow beam or fan, rather than a single point or beam of light, and is able to extend around and beyond obstacles for the convenience of a user. In one embodiment of the invention, the angle A between the mirror surface of the collimating lens and the incident light from the laser diode source is from about 60 to about 65 degrees, preferably about 63 degrees, for maximum reflection of light through the lens, rather than refraction at angles that detract from the performance of the generator. In this depiction, the light 68 is planar within the plane of the paper, when it leaves the lens. In one embodiment of the invention, the laser diode, the collimation lens, and the projection lens are contained within a single element, such as a laser diode with included collimating optics.

In one embodiment shown in FIG. 6, an aspherical projection lens 64 is made from optic grade glass, in the form of an equilateral triangle with the back face mirrored. Desirably, the lens is about 0.45 inches on a side, with one corner 65 radiused to about 0.030 to about 0.060 inches and the other corners rounded to a radius of 0.005 to 0.015 inches. With this geometry, the lens or prism is able to focus an ovate beam into a planar fan-shaped beam useful for aligning objects.

FIG. 7 depicts a side view of another embodiment of the invention, in which a laser light source 70, such as a laser diode, emits laser light, which is collimated into an ovate shape by collimating optics 72 and then sent to an aspherical projection lens 74 with one corner 75 radiused as mentioned above for projection of a narrow fan of light 76. In one embodiment, the axes of the ovate-shaped beam sent to the lens are about ³⁄₁₆ inches by about ¹⁄₁₆ inch. The planar, fan-shaped beam 76 emerging from projection lens 74 is than about ¹⁄₃₂ inch thick. Note that the top corner 75 on the face of the lens in FIG. 7 is radiused from about 0.030 to about 0.060 inches, and preferably about 0.047 inches. FIG. 8 depicts the same embodiment in a top view, in which the rounding may not be observable. The source of laser light 70 generates visible laser light and the collimating optics 72 shape the light into a narrow beam. From the top view, the beam of light is very thin and is about the width of the projection lens 74, 0.4 inches wide. From the side view, the projected light is a thin beam; from the top view, the projected light is a thin fan.

One embodiment of the invention features a lens, such as the lenses depicted in FIGS. 7 and 8, that is about 0.4 inches (10 mm) square, and about 0.1 inches thick (2.5 mm) in the direction of propagation, that is able to focus the incoming laser light beam and reflect it into a planar fan shape. The lenses are aspherical, cylindrical lenses. The lens may be made from one of several optical-grade clear, highly transparent materials, including BK7 glass having an index of refraction of about 1.5168 and a Vd of 64.17. In another embodiment, acrylic resin having an index of refraction of 1.4917 and a Vd of about 55.31 is useful. It has been found that the lens works better if the exit face has only one corner radiused about 0.047 inches, with the other faces being radiused for normal manufacturing custom, to about 0.005 to about 0.015 inches. More details on the performance of these lenses are discussed in copending application U.S. patent application Ser. No. 10/141,392, entitled Laser Line Generating Device, assigned to the assignee of the present application and which is hereby incorporated by reference in its entirety.

FIG. 9A demonstrates the use of an embodiment of a laser generator 10 according to the present invention, in which a fan-shaped beam 76 is able to align a first picture frame 78 on wall 77. The generator is convenient to use because it projects a laser beam on the wall adjacent the generator. The beam is able to overcome obstacles such as door moldings 80 with its fan shape and extend above the molding with sufficient clarity to align another object, such as picture frame 82. It is able to overcome these obstacles because the corner from which the light exits is one or two inches removed or offset from the wall, allowing a fan or beam of light to form. The direction of propagation 84 generally is in the direction from the generator to the objects on which alignment is desired, such as picture frames. At the same time, the width of the fan is perpendicular to the wall 77 on which the paintings are hung or on which, more generally, alignment is desired. The fan-shaped beam 76 intersects the wall 77 and the light is visible on the wall at the intersection 79 of the fan-shaped beam 76 with the wall 77. In one embodiment, the housing of the laser line generator is a support face that substantially extends along a first planar surface, such as wall 77, and the fan shaped beam 76 substantially lies within a second planar surface, such as the plane of light 76. The second planar surface may intersect the first planar surface at an angle. The angle may preferably be 90 degrees, or a right angle between the fan-shaped beam and the surface on which objects are to be aligned.

The "comet" effect means that the intensity of the planar fan is less nearer the wall and greater away from the wall, so that the beam is able to usefully travel further, and enable a user to align objects at greater distances. Thus, in FIGS. 9B and 9C, the intensity of the laser light will be greater at outer edge 87 than at the inner edge 85 where the fan-shaped beam intersects the wall 77 while the beam is used to align object 82, such as a picture frame. There is no practical limitation to the distance the fan-shaped beam can travel. Laser diodes of 5-15 mW can be successfully used to project beams 30-50 feet long along painted wall-board surfaces. In one embodiment, the fan-shaped beam is projectable as a visible line extending at least about 5 lengths away from the housing for aligning objects.

Figure 10:
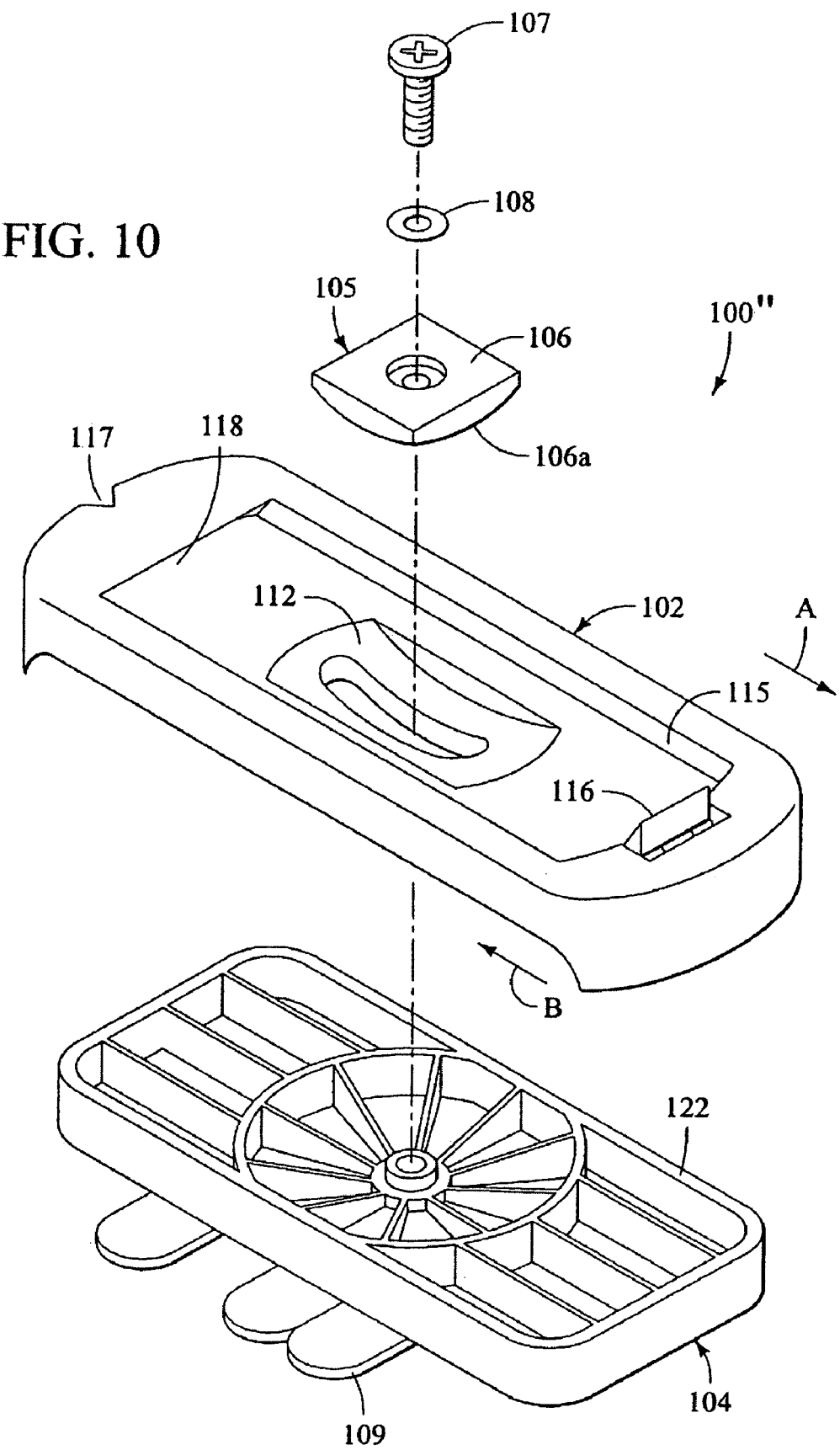
FIG. 10 depicts an exploded view of a swivel base for the laser line generating device.

The laser line generator 10 described previously with respect to FIGS. 1-9C can be utilized with an adhesive base or attachment, an embodiment of which is depicted in FIGS. 10-13. FIG. 10 shows an exploded view of an attachment 100". The attachment 100" includes an inner or top portion 102, an outer or bottom portion 104 and a joining portion 105. The joining portion 105 may include a large plastic retainer 106, a bolt 107, washer 108, and a nut 125. Top and bottom portions 102, 104 may be molded from any convenient plastic, and nut 125 may be molded into bottom portion 104. The attachment 100" is assembled with a fastener, such as bolt 107 threaded into nut 125. Retainer 106 fits into a recess 112 on the top surface of top portion 102. Retainer 106 may be flat on its top and convex on its bottom surface 106a to match the contours of the concave recess 112. Adhesive strips 109 are mountable to the bottom surface 126 of bottom portion 104, and portions thereof or release tabs 127 for strips 109 may protrude from the side of the attachment. Additional washers, such as lock washers, may also be used with the fastener and retainer. Top portion 102 also mounts a latch 116 for retaining the laser line generator on the swivel base. The top portion may also mount one or more level indicators, such as the bubble levels described above, for one or more axes of the top portion, such as on the long and short sides of top portion 102. With these levels, a user may place the base on a wall and use the bubble levels to orient first the swivel base and then the laser line generator to a true plumb alignment.

In addition to manual level indicators, as described above, the swivel base may also include other automatic levelers. These devices may include automatic pendulum-type levelers, in which an internal or external pendulum, along with gravity, orients and levels the swivel base, and thus the laser line generator. Other automatic levelers could include electronic levelers, a shaft held between journals, cantilevered tilt mechanisms, and so forth. Details on some of these levelers are disclosed in U.S. Pat. Nos. 4,031,629, 4,751, 782, 5,075,977, and 5,992,029, among others.

Figure 11A:
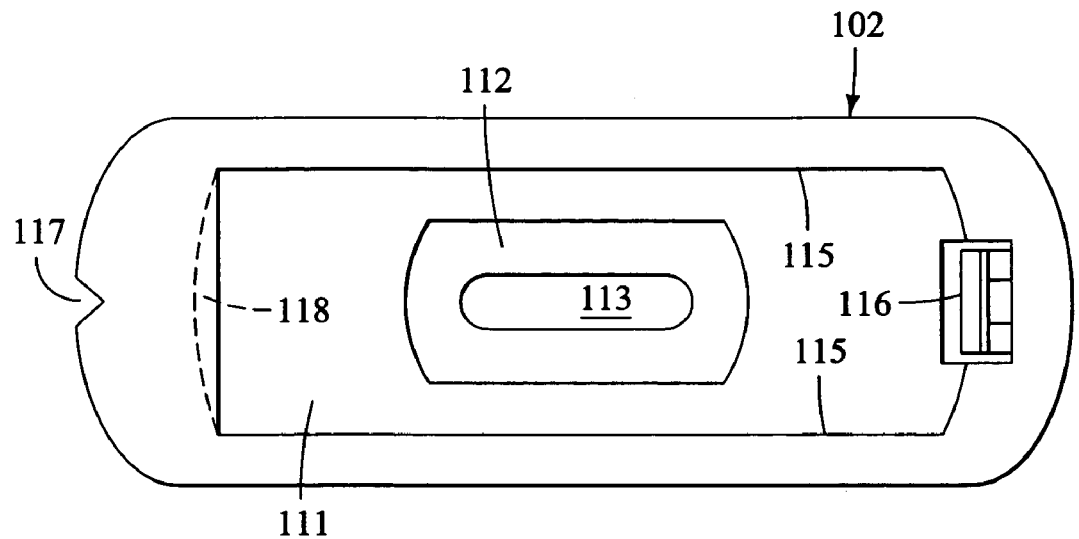
FIGS. 11A and 11B depict top and bottom views of the top portion of the embodiment of FIG. 10.
Figure 11B:
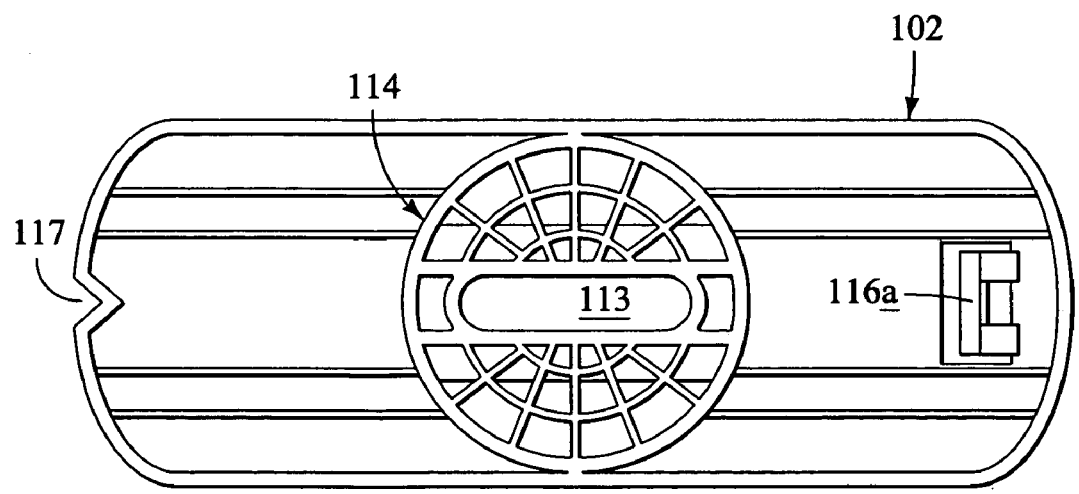

FIGS. 11a and 11b are more detailed views of the top and bottom of top portion 102 of the attachment. Top portion 102 includes a flat surface 111, a recess 112, and an orifice 113. Flat surface 111 may be adapted so that the bottom surface of the laser line generator 10 of FIGS. 1-5 and 6-9C, contacts flush with the flat surface between sidewalls 115, which, along with latch 116, retain the laser line generator securely in the swivel base. In the preferred embodiment, the surface is slightly recessed. The end of top portion 102 opposite latch 116 has another recess 118, for receiving a portion of laser line generator bottom 28.

Recess 112 is curved to match the bottom, interface surface 114 of top portion 102. Interface surface 114 allows top portion 102 to swivel or rotate relative to bottom portion 104 for a full 360 degrees swiveling and orienting capability. The underside interface surface 114, which comprises a convex shape, may be solid or may be ribbed as shown for lighter weight and ease of use of both the swivel base and the mounted laser line generating device.

A user inserts the bottom 30 of laser line generating device 10 of FIGS. 1-5 and 6-9C into recess 118 on flat surface 111, while urging latch 116 forward, in the direction of arrow A. After the bottom 30 of the laser line generating device 10 is inserted and is resting on flat surface 111, latch 116 is released. Latch 116 then moves in the direction of arrow B, and helps to retain the laser line generator in position on top portion 102. Latch 116 may be a snap-fit design that can snap into place without the need to urge the latch forward, with a bottom surface 116a flat to match bottom 30 of laser line generator 10. Top portion 102 may also have a notch 117 to assist in marking purposes. When removing the device 10 from top portion 102, latch 116 may be urged forward to release the device from top portion 102.

In another alternative embodiment of the connection structure, the connection structure of FIGS. 10-13 is interchanged so that the bottom surface of the laser line generator 10 includes side walls and recesses similar to side walls 115 and recesses 118 of FIGS. 10-13. The bottom surface of the laser line generator also includes a latch similar to latch 116. The base and laser line generator are attached to one another by inserting the top portion of the attachment into the recessed area of the bottom surface of the generator and then applying the latch in a manner described previously for embodiments of FIGS. 10-13.

Figure 12A:
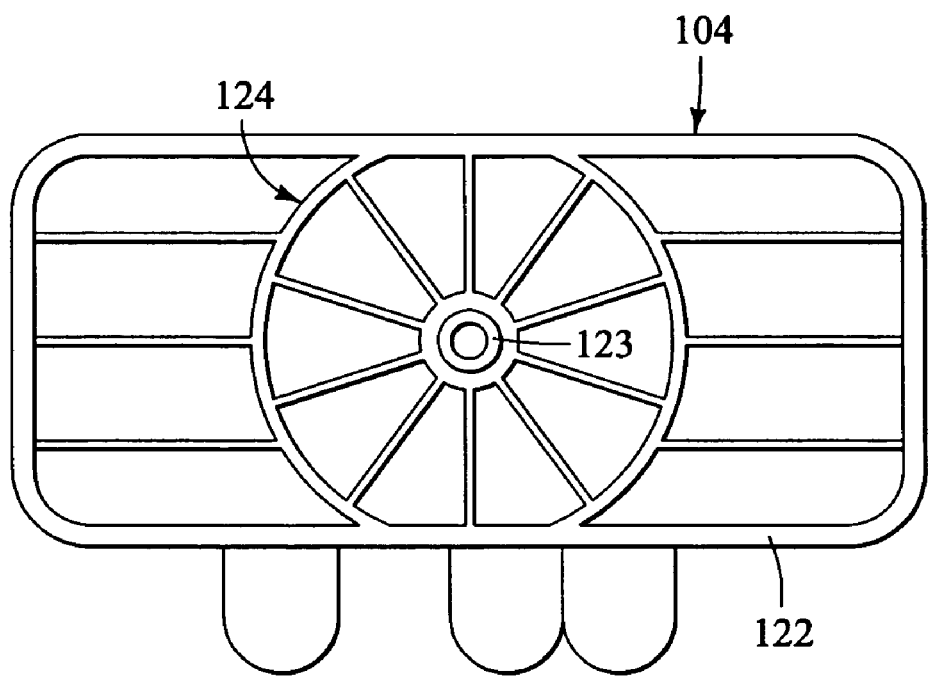
FIGS. 12A and 12B depict top and bottom views of the bottom portion of the embodiment of FIG. 10.
Figure 12B:
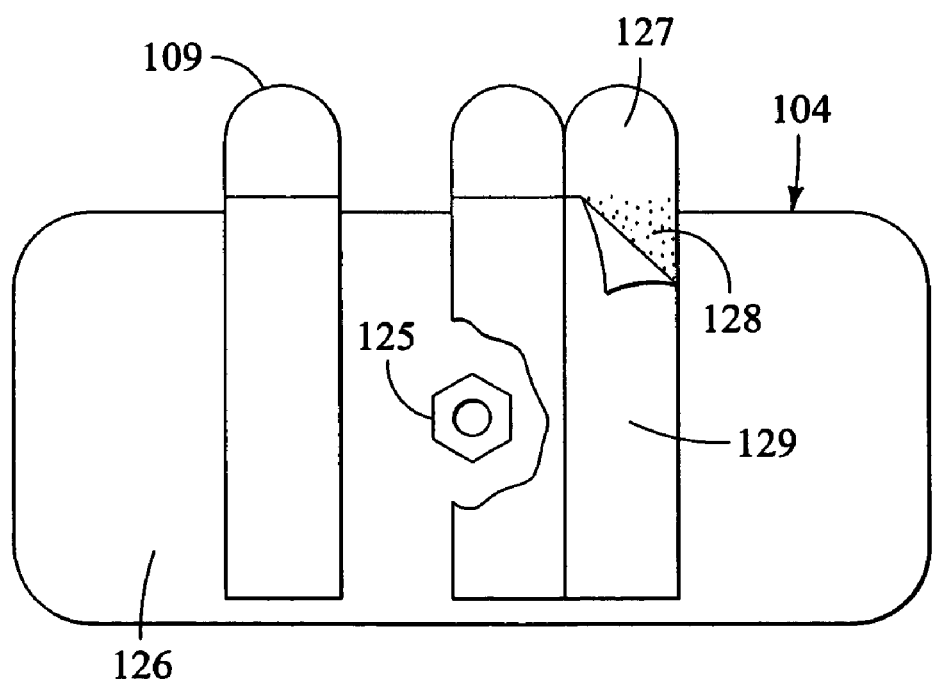

FIGS. 12A and 12B provide top and bottom views of bottom portion 104 of adhesive base attachment 100". Bottom portion 104 has a top surface 122 and an interface surface 124 that is curved to match the bottom interface surface 114 of top portion 102. Top interface surface 124 is concave to match convex bottom interface surface 114. This surface may also be ribbed as shown for lighter weight, or may be made from solid material. The remainder of top surface 122 may be solid or may be ribbed, including rib 123 aligned for nut 125 which is molded into bottom portion 104. Bottom surface 126 of bottom portion 104 is preferably flat for mounting adhesive strips 109, comprising adhesive 128, release liners 129 and release tabs 127. Flat bottom surface 126 and adhesive strips 109 form an adhesive interface surface for the laser line generator with swivel base.

The attachments 100-100" may also be combined to achieve variations of the generator 10. For example, as seen FIG. 12D, the generator 10 may be attached to an attachment 100' that includes both an indexing system 51' and enables the generator 10 to rotate and pivot relative to the working surface 77. In this exemplary embodiment, a top portion 102' of the attachment 100''' may be integral to the housing 12 of the generator 10 or may otherwise be attached thereto. The top portion 102' of the attachment 100''' may include a retaining slot 160 and one or more guide slots 162. The retaining slot 160 may be disposed near a center of a bottom surface 164 of the top portion 102' and may be adapted to guide a retainer 106' that is connected to a bottom portion 104' via a fastener, such as a screw or bolt 107'. A lower surface 106a' of the retainer 106' may include a convex surface to compliment the general shape of the top portion 102'. The one or more guide slots 162 may be aligned with the retaining slot 160 and may be sized and shaped to receive one or more protrusions 166 extending from the bottom portion 104' for guiding and aligning the housing 12 and/or the top portion 102' relative to the bottom portion 104'. The bottom surface 164 of the top portion 102' may have a generally convex shape over a majority of the surface, which may be adapted to sliding engage a recessed concave surface 168 disposed on the bottom portion 104'.

The bottom portion 104' of the attachment 100''' may include an indexing ring 53', an indicator ring 170 having an indicator arm 172, and a base portion 174. The base portion 174, in this example, is generally round and includes the recessed concave surface 168 disposed near a center of the base portion 174. A ledge 176 disposed around a periphery of the base portion 174 in combination with an outer wall 178 of the base portion 174 may define an area for receiving the indexing ring 53'. The indexing ring 53', as seen in FIG. 12D, has a generally cylindrical shape including an inner surface 179 adapted to slidingly engage the outer wall 178 and an outer surface 180 adapted to receive markings, or the like. The markings, for example, may be part of the indexing system 51' that may represent the degrees of rotation about the laser generator 10, such that a user can determine the number of degrees present between a first position and a second position, and/or rotate the laser light at predetermined angles, such as forty-five degrees or ninety degrees.

The indicator ring 170 may be disposed on a top of the bottom portion 104', and may include a bottom surface 182 for slidingly engaging a top of base portion 174 and may include a top surface 184 that may receive a portion of the bottom surface 164 of the top portion 102'. A plurality of tabs 186 extending downwardly from an interior of the indicator ring 170 may snappingly engage the base portion 174, such that the indicator ring 170 is secured to the base portion 174, yet is able to rotate relative thereto. The indicator arm 172 may extend radially from the indicator ring 170 and may be adapted to indicate at what radial position the laser light may be positioned by corresponding the laser light to a marking on the indexing ring 53'. The one or more protrusions 166 may extend upwardly from the indicator ring 170 and may be sized and shaped to engage the one or more guide slots 162. The one or more protrusions 166 may be aligned with the indicator arm 172, and in this example, may be a part thereof.

Referring back to FIG. 12B, adhesive 128 is preferably a removable pressure-sensitive adhesive for mounting the attachment 100 to a wall. The special adhesive used allows for easy removal from a wall on one side and for easy removal from surface 126 on the other side of the adhesive. Pressure-sensitive adhesives, such as adhesive 128, are self-adhering with a slight amount of pressure, rather than adhesives requiring heat or water activation. Pressure-sensitive adhesives may be made from rubber-based or acrylic stocks, and may be manufactured in several ways. For instance, a central carrier or foam core may have pressure-sensitive adhesive applied by a hot melt process, a solvent-evaporation process, or an emulsion process. A release liner may be applied to one or both sides of the adhesive. Strong double-sided tape may be used as well.

In the preferred embodiment, a first release liner (not shown) is removed from one side of the adhesive so that the adhesive may be secured to bottom surface 126. Release liner 129 on the other side is then removed and the swivel base and laser line generator are then adhered to a surface on which objects are to be aligned, such as wall 77 of FIGS. 9A-9B. If removable pressure-sensitive adhesives are used, the swivel base may be removed without damaging the surface on which the objects were aligned. While many such adhesives may be used, "Command Strips," from the 3M Company, Minneapolis, Minn., are preferred. These adhesives are actually two adhesives interlocked in the center. These adhesives may be purchased, separable and aligned, for single use in adhering the swivel base, and the laser line generating device, to a wall or other surface. A pack of strips may be adhered to the bottom surface of the swivel base in a group as shown, for example, in FIG. 12B. A single release liner 129 from one of the strips is then removed and the swivel base 100 is removably affixed to a wall on which alignment of objects is desired. When the alignment operation is completed, the outer release tab 127 is then pulled to release the adhesive strip from the wall and the used adhesive is discarded.

Figure 12C:
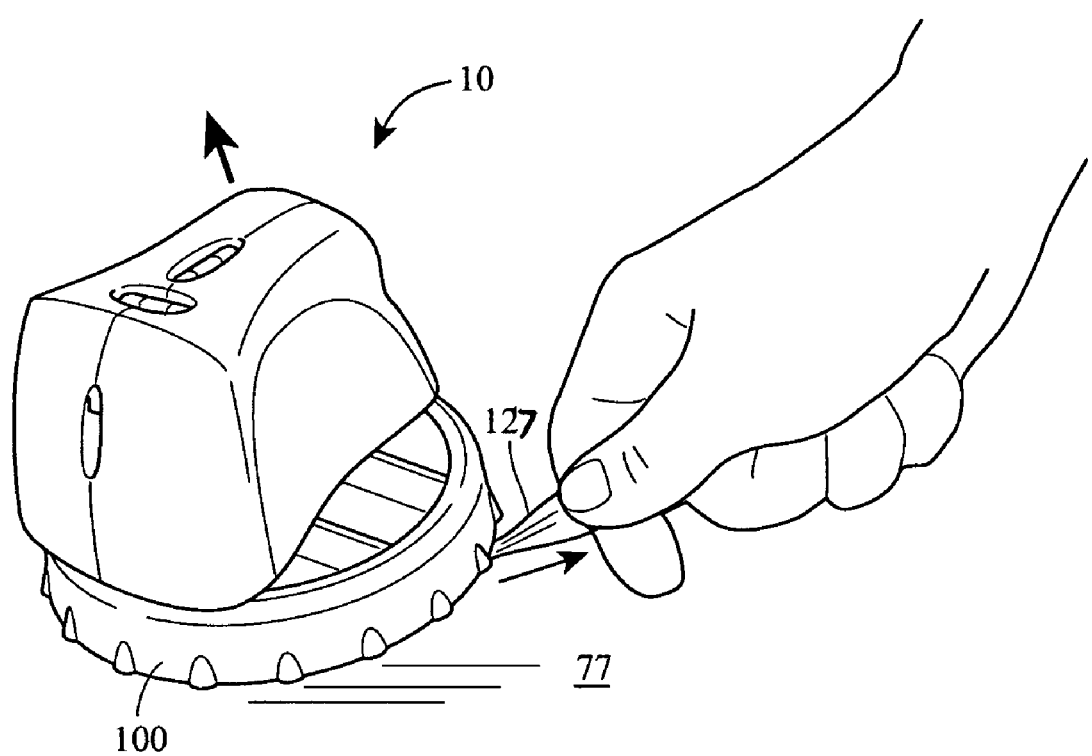
FIG. 12C depicts an assembled laser line generator being removed from a surface.
Figure 12D:
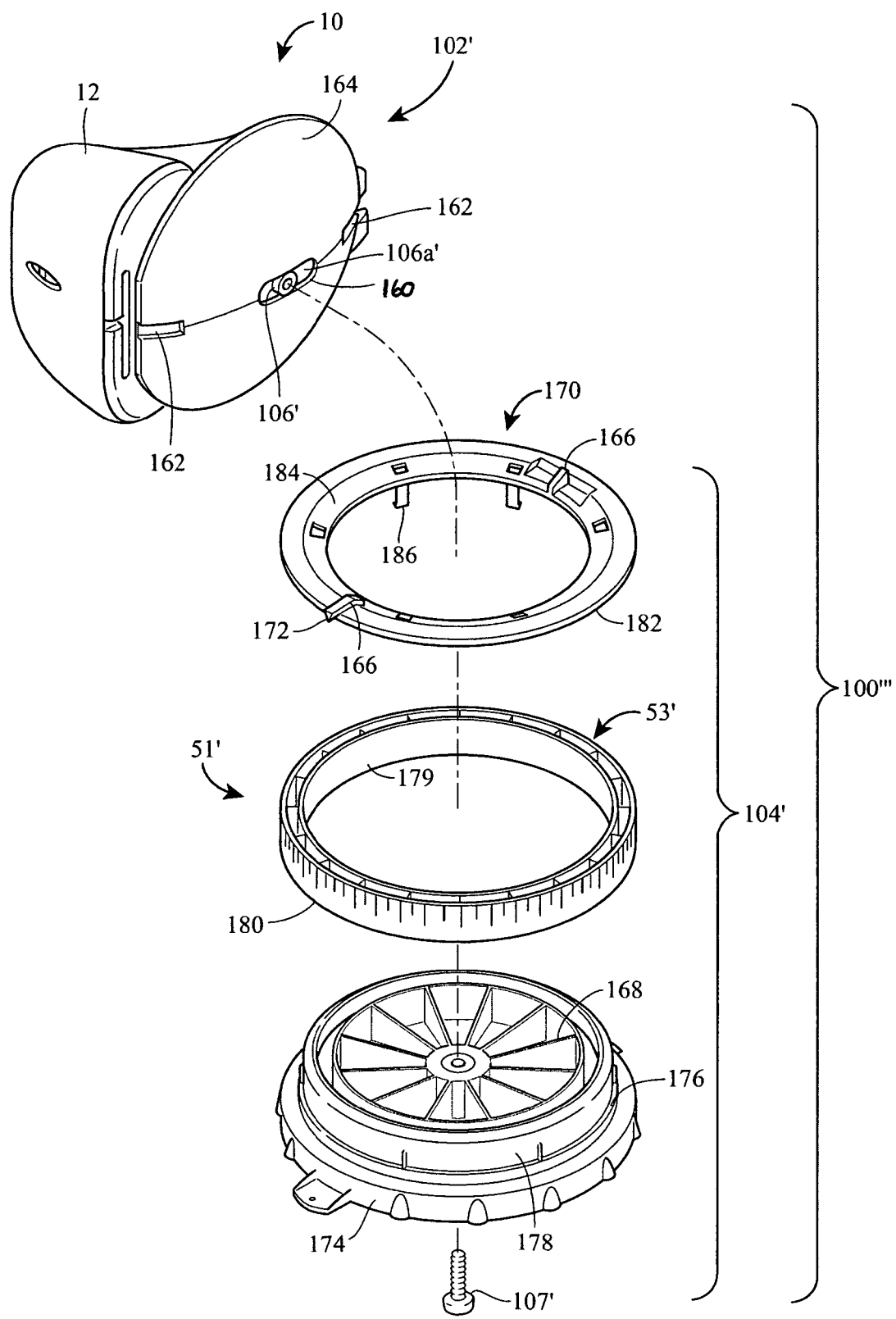
FIG. 12D is an exploded view of a laser line generator with a pivoting and rotational base having an indexing system thereon.

In one exemplary operation, the adhesive strip 109, as seen in FIG. 12C, may be constructed and attached to the laser generator 10, in such as manner, as to effectuate an easy and nondestructive removal of the laser generator 10 from the wall 77 by a simple pull on the release tab 127 extending beyond the periphery of the laser generator 10. More specifically, the adhesive strip 109 may be disposed between and temporarily adhere the laser generator 10 to the wall 77. By pulling on and thereby stretching the adhesive strip 109, an incremental release of the laser generator 10 from the wall 77 without ripping or causing damage to the adhesive strip 109 and the wall 77 may be obtained. The release tab 127, as shown in FIG. 12C, extends past a periphery of the generator 10 and/or the attachment 100, such that the user may pull on the release tab 127 in a direction parallel and/or perpendicular to the working surface or wall 77.

Figure 13:
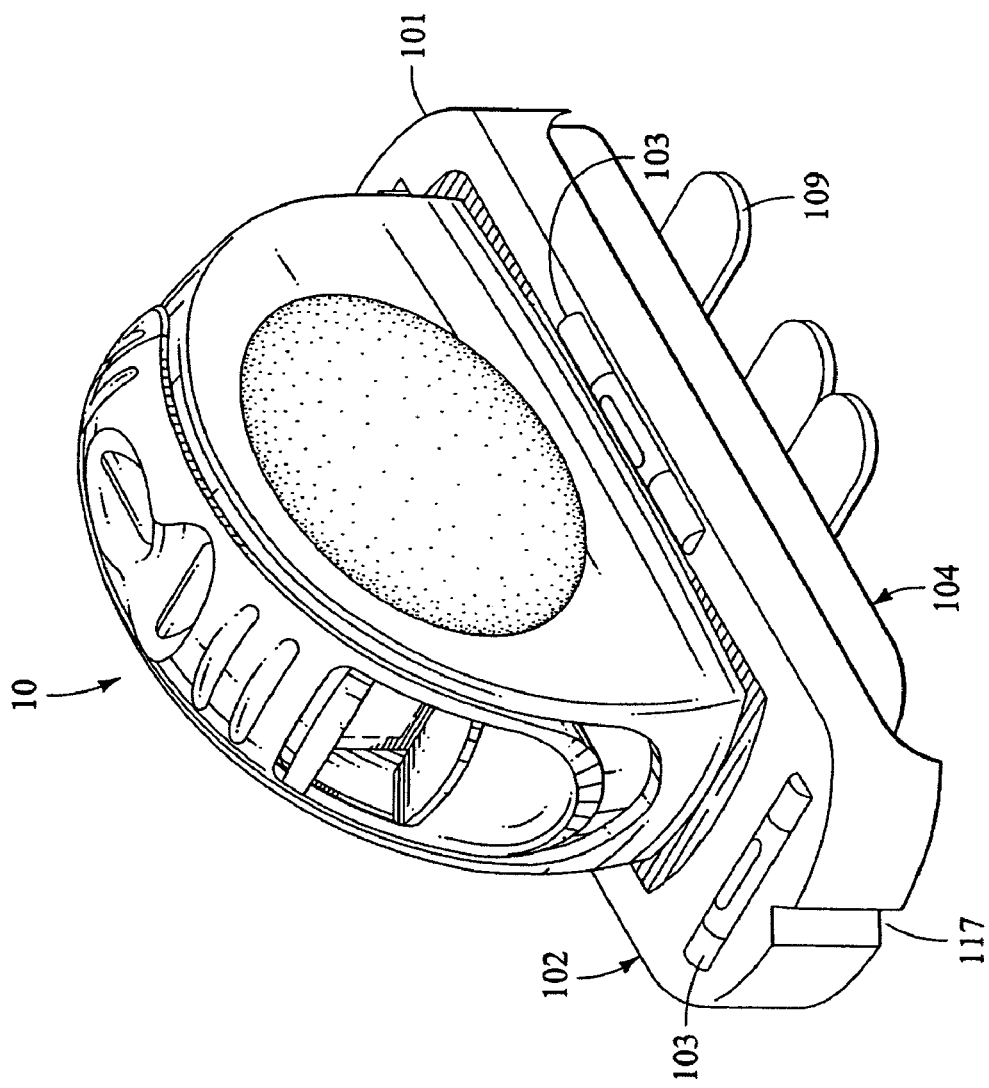
FIG. 13 depicts an alternate embodiment of an assembled laser line generator having a pivoting and rotational base.

In use, the laser line generator 10 and the base 100 can be packaged as separate from one another within a volume of space defined by a container, wherein the container, generator and base define a kit. In one embodiment, the swivel base may also contain level indicators, such as spirit or bubble levels. Once the generator and base are removed from the container, the laser line generator 10 is assembled or placed onto top portion 102 of the swivel base 101, with at least one adhesive strip 109 in place on bottom portion 104, as depicted in FIG. 13. Swivel base 101 is virtually identical to previously-described swivel base 100, but swivel base 101 also includes spirit levels 103 oriented on two planes of top surface 102 of swivel base 101. Using the ability of the base to swivel and rotate, the user tilts the laser line generator in the desired direction and then uses the bubble levels 16, 18 to level laser line generator 10. The combination of laser line generator 10 and swivel base 100 is used in the same manner as that described with reference to FIGS. 9A-9C, with fan-shaped beam 76 propagating in the direction from the laser line generator 10 to objects 78, 82 to be aligned, the width of fan-shaped beam 76 being perpendicular to wall 77. When the user has completed the alignment task, the user pulls on the release tab 127, releasing the adhesive from wall 77 or other surface. The adhesive strip that was used may then be removed from bottom surface 126 of bottom portion 104 and discarded. The user may then go on to other alignment tasks as desired.

In other embodiments of the connection structure, either the base 30 of the generator 10 or the top portion 102 may be provided with a magnet that mates magnetically with either another magnet material or ferrous material on the opposing surface. This can retain the laser generator 10 to the swivel base without the use of a latching structure. Hook and loop fasteners, such as Velcro®, may also be used to attach the laser generator to the swivel base. Magnetic attraction may also be used with a magnet on one of the top portion or generator, and a metal plate, such as steel or iron, on the other. Other ways may also be used, such as a tab-and-slot arrangement, with a slot or groove on the bottom portion and a matching tab or other feature on the top portion. All these are ways to join the top portion of the swivel base to the light generator.

Figure 14A:
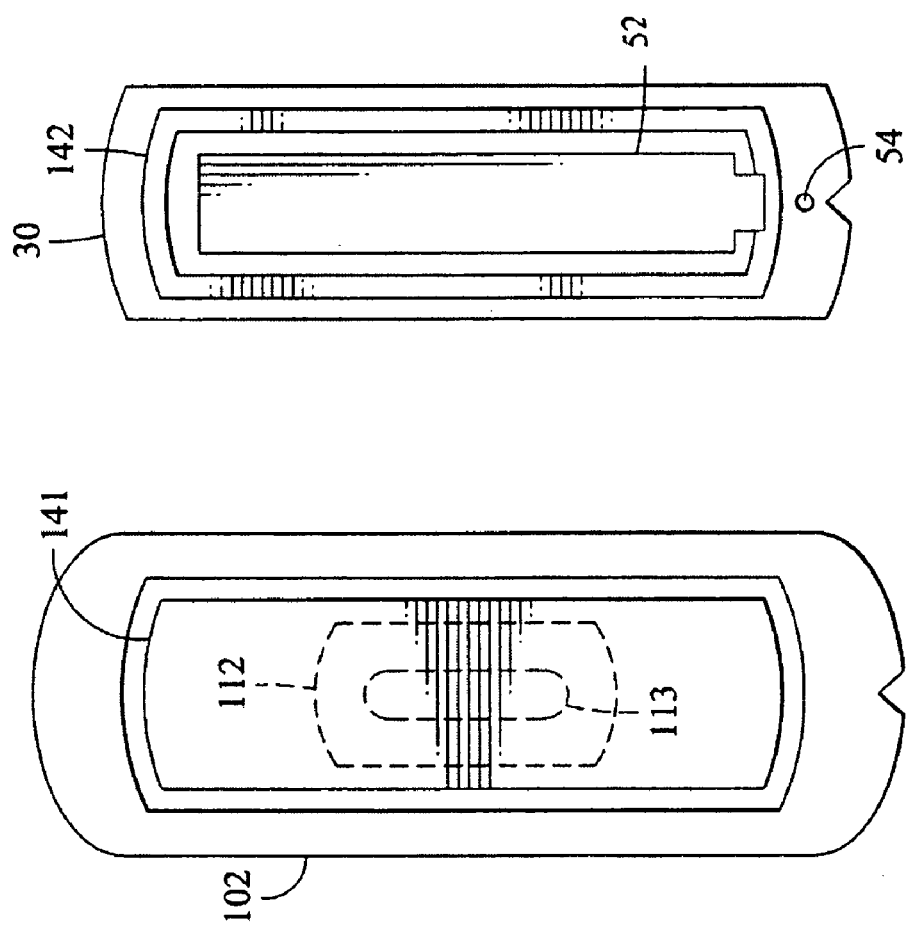
FIGS. 14A, 14B, and 15 depict other techniques used to assemble a light generator to a swivel base.
Figure 14B:
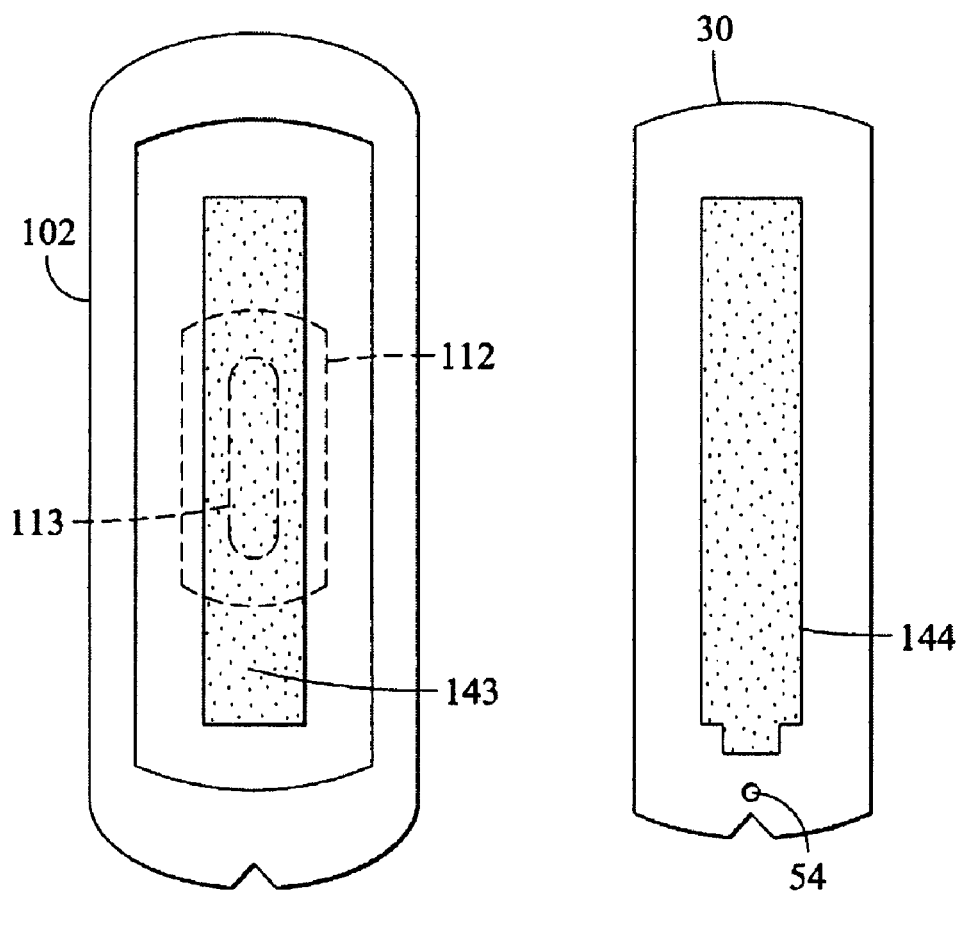
Figure 15:
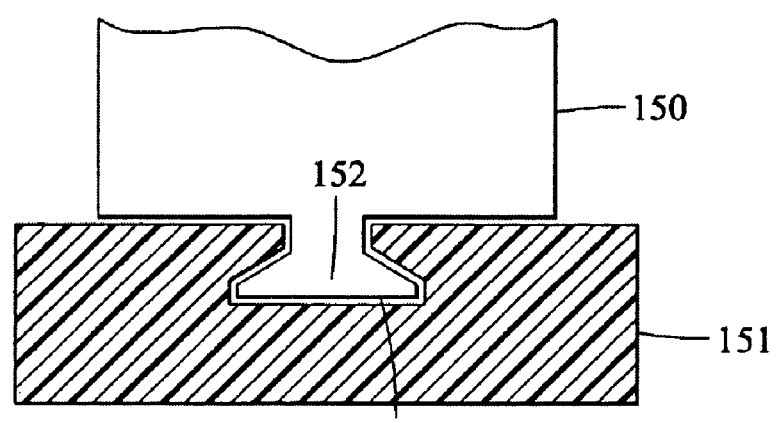

Some of these other ways are depicted in FIGS. 14A, 14B, and 15. For instance, in FIG. 14A, the swivel base top 102 may mount a ferrous plate 141 on its front face, while the: light generator bottom 30 mounts a magnet 142 on its bottom 30 near battery door 52 to attract and hold the ferrous plate and the stud finder. Ferrous plate 141 may lie atop the recess 112 and orifice 113 which may still be utilized to mount top 102 of the swivel base to the bottom portion of the swivel base (see FIG. 10). In another method, shown in FIG. 14B, the swivel base bottom 102 mounts a hook portion 143 of a hook-and-loop fastener, such as Velcro®, while the light generator bottom 30 mounts the loop portion 144 as part of the battery door, to hold light generator 10 to top portion 102 of the swivel base. As is well known, hook and loop fasteners are typically adhered to devices by an adhesive that very firmly bonds the fastener to the device. This adhesive attachment is an inherent part of the hook and loop fasteners herein described. FIG. 15 depicts another way to mount the light generator 150 onto the swivel base top 151, by providing a tab 152 on the bottom surface of light generator 150, and by providing a matching slot 153 in the top surface 151 of the swivel base, so the light generator may be slid into the swivel base. A catch or retainer may also be used to insure retention of the light generator when the assembly is held vertically. As such, even tough some of the methods and embodiments described herein may allow for attachment of the generator 10 either permanently or removably to a working surface or wall 77 via an adhesive strip 109 or otherwise, the generator 10 may have pivot and rotating capability provided by the attachments 100-100''', and as shown in FIGS. 5A, 5B, and 10-15.

While this device and method has been shown and described in connection with the preferred embodiments, it is apparent that certain changes and modifications, in addition to those mentioned above, may be made from the basic features of this invention. While the laser line generator may be most convenient to use when mounted to a wall, it may also be mounted on a table, floor, or other flat surface, and used to project a line without being mounted on a wall. While the swivel base may be used with the described laser line generator, the swivel base may also be used with other leveling devices, laser generators, or with other non-laser light or line generators. Many other variations of the invention may also be used without departing from the principles outlined above. Accordingly, it is the intention of the applicant to protect all variations and modifications within the valid scope of the present invention. It is intended that the invention be defined by the following claims, including all equivalents.

What is claimed is:

1. A laser alignment device disposable on a reference surface, comprising:
   a laser generating device including a housing and a laser generator, the laser generator arranged to produce a fan shaped beam of light defining a plane; and
   a base having bottom surface adapted for placement parallel to the reference surface, the base including an upper attachment portion arranged to receive a bottom portion of the housing and a lower attachment portion pivotally connected to the upper attachment portion, the lower attachment portion comprising;
   an indicator ring having one or more tabs extending from a bottom surface thereof;
   an indexing ring; and
   a base portion that receives the one or more tabs thereby securing the indicator ring to the base portion with the indexing ring held between the indicator ring and the base portion such that the indicator ring is rotatable relative to the base portion,
   wherein the housing and the base are coupled to one another to permit the fan shaped beam of light to propagate in a direction parallel to the plane of the bottom surface such that the plane of the fan shaped beam of light is arranged to extend perpendicular relative to the reference surface when the bottom surface is disposed adjacent the reference surface thereby creating a line of light on the reference surface.

2. The laser alignment device of claim 1, wherein the upper attachment portion is removably attached to the housing.

3. The laser alignment device of claim 1, wherein the upper attachment portion is integral to the housing.

4. The laser alignment device of claim 1, wherein the lower attachment portion is slideably connected to the upper attachment via a joining portion.

5. The laser alignment device of claim 4, wherein the upper attachment portion is disposed between a retainer of the joining portion and the lower attachment portion.

6. The laser alignment device of claim 5, wherein the retainer is attached to the lower attachment portion via one of a screw and a bolt.

7. The laser alignment device of claim 5, wherein the retainer includes a convex bottom surface that corresponds and slidingly engages with the upper attachment portion.

8. The laser alignment device of claim 1, wherein the upper attachment portion includes a convex bottom surface that corresponds and slidingly engages with a concave recess disposed in the lower attachment portion.

9. The laser alignment device of claim 1, wherein the lower attachment portion is rotatably connected to the upper attachment portion.

10. The laser alignment device of claim 1, further including an adhesive strip attached to a bottom surface of the lower attachment portion, wherein the adhesive strip is adapted to temporarily attach the laser alignment device to a working surface.

11. The laser alignment device of claim 10, wherein the laser alignment device, once attached to the working surface, may be removed from the working surface by pulling on a portion of the adhesive strip extending beyond the lower attachment portion.

12. The laser alignment device of claim 11, wherein the portion of the adhesive strip extending beyond the lower attachment portion is pulled in a direction generally parallel to the reference surface.

13. A laser alignment device for use adjacent a reference surface and comprising:
   a housing having a laser generator, the laser generator adapted to produce a fan-shaped beam of light in a direction of propagation, the fan shaped beam of light defining a plane;
   a base having a top portion and a bottom portion, the top portion adapted to releasably engage a portion of the housing, the bottom portion comprising;
   an indicator ring having one or more tabs extending from a bottom surface thereof;
   an indexing ring; and a base portion that receives the one or more tabs thereby securing the indicator ring to the base portion with the indexing ring held between the indicator ring and the base portion such that the indicator ring is rotatable relative to the base portion, the base portion having a bottom surface comprising a plane arranged for placement parallel to a plane of the reference surface;

the top portion and the bottom portion connected to one another by a swivel connection arranged to permit the top portion to rotate relative to the bottom portion about a first axis extending perpendicular relative to the plane of the bottom surface; and the laser generator oriented within the housing such that the direction of propagation is parallel to the plane of the bottom surface with the plane of the fan shaped beam of light oriented perpendicular relative to the plane of the bottom surface;

wherein a line of light may be formed on the reference surface when the device is used with the bottom surface disposed on the reference surface.

14. The laser alignment device of claim 13, further including an adhesive strip attached to a bottom surface of the bottom portion, wherein the adhesive strip is adapted to temporarily attach the laser alignment device to the reference surface.

15. The laser alignment device of claim 14, wherein the adhesive strip is releasable by pulling on a portion of the adhesive strip extending beyond the lower attachment portion.

16. The laser alignment device of claim 15, wherein the portion of the adhesive strip extending beyond the lower attachment portion is pulled in a direction generally parallel to the reference surface.

17. The laser alignment device of claim 13, wherein the base includes a plurality of markings angularly disposed around a periphery of the lower attachment portion.

18. The laser alignment device of claim 17, wherein the plurality of markings are equally spaced apart from each other.

19. The laser alignment device of claim 13, wherein the swivel connection is further arranged to permit the top portion to rotate relative to the bottom portion along second axis extending perpendicular relative to the first axis and parallel to the plane of the bottom surface.

20. A laser alignment device for use adjacent a reference surface and comprising:
a housing having a laser generator, the laser generator adapted to produce a fan-shaped beam of light and to direct the beam of light in a direction of propagation, the fan beam of light defining a plane;
a base having a top portion and a bottom portion, the top portion of the base and a lower portion of the housing adapted for releasable engagement with one another, the bottom portion comprising,
an indicator ring having one or more tabs extending from a bottom surface thereof;
an indexing ring; and
a base portion that receives the one or more tabs thereby securing the indicator ring to the base portion with the indexing ring held between the indicator ring and the base portion such that the indicator ring is rotatable relative to the base portion, the base portion having a bottom surface comprising a plane arranged to abut a plane of the reference surface;

the top portion and the bottom portion meeting along an interface and having cooperating convex and concave surfaces joined by only a single bolt to form a swivel connection, the swivel connection arranged to permit the top portion to rotate relative to the bottom portion about a first axis extending perpendicular relative to the plane of the bottom surface, the swivel connection further arranged to permit the top portion to pivot relative to the bottom portion along a curved interface defined between the top portion and the bottom portion; and the laser generator oriented within the housing such that, when the device is operated adjacent the reference surface, the direction of propagation is parallel to the plane of the bottom surface with an inner edge of the beam of light extending along the reference surface to form a line of light and with the plane of the beam of light oriented perpendicular relative to the plane of the bottom surface.

21. The laser alignment device of claim 20, including a plurality of index markings on said indexing ring adapted to indicate an angle of the top portion relative to the bottom portion.

22. The laser alignment device of claim 20, further including an indicator arm attached to the bottom portion and radially aligned with the plane of the beam of light thereby indicating the rotational position of the beam of light.

23. The laser alignment device of claim 22, wherein the indicator arm is rotatably attached to the bottom portion.

24. The laser alignment device of claim 20, further including releasable adhesive strip attached to a bottom surface of the lower attachment portion.

25. The laser alignment device of claim 24, wherein the portion of the adhesive strip extending beyond the bottom portion is pulled in a direction generally parallel to the reference surface.

26. The laser alignment device of claim 20, wherein the swivel connection includes a concave recess carried by the top portion, the concave recess receiving a convex bottom surface of a retainer secured by the bolt.

27. The laser alignment device of claim 20, including a pair of retractable pins that extend through the plane of the bottom surface of the housing.

28. The laser alignment device of claim 20, wherein the housing is releasably secured to the base by a tab in slot connection.

* * * * *